US006763197B1

(12) United States Patent  
Hirano et al.

(10) Patent No.: US 6,763,197 B1  
(45) Date of Patent: Jul. 13, 2004

(54) OPTICAL TRANSMITTER AND OPTICAL TRANSMITTER CONTROL METHOD USING VARIABLE DUTY RATIO SETTING AND ALTERNATE PHASE INVERSION FOR OPTICAL CLOCK PULSES

(75) Inventors: Akira Hirano, Yokohama (JP); Kazushige Yonenaga, Yokosuka (JP); Yutaka Miyamoto, Yokohama (JP); Kenji Sato, Yokosuka (JP); Masaki Asobe, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 575 days.

(21) Appl. No.: 09/588,412

(22) Filed: Jun. 6, 2000

(30) Foreign Application Priority Data

Jun. 8, 1999  (JP) ........................................ P11-160929  
Nov. 24, 1999  (JP) ........................................ P11-333094  
Mar. 23, 2000  (JP) ..................................... P2000-082997

(51) Int. Cl.$^7$ .............................................. H04B 10/04
(52) U.S. Cl. ........................ 398/192; 398/191; 398/193
(58) Field of Search ............................ 398/75, 91, 154, 398/189, 191, 195, 161, 163, 193, 192; 327/161, 175, 238; 356/474, 477; 385/14

(56) References Cited

U.S. PATENT DOCUMENTS

| | | | | |
|---|---|---|---|---|
| 4,959,540 A | * | 9/1990 | Fan et al. ............... | 250/227.12 |
| 5,184,243 A | * | 2/1993 | Henmi et al. ................ | 398/147 |
| 5,353,114 A | * | 10/1994 | Hansen ........................ | 356/477 |
| 5,543,952 A | * | 8/1996 | Yonenaga et al. .......... | 398/185 |
| 5,912,755 A | * | 6/1999 | Bergano ..................... | 398/185 |
| 5,926,297 A | * | 7/1999 | Ishikawa et al. .............. | 398/43 |
| 6,097,525 A | * | 8/2000 | Ono et al. ................... | 398/185 |
| 6,388,786 B1 | * | 5/2002 | Ono et al. ................... | 398/183 |

FOREIGN PATENT DOCUMENTS

| | | |
|---|---|---|
| JP | 09261207 | 10/1996 |
| JP | 09-261207 | 10/1997 |
| JP | 10079705 | 3/1998 |
| JP | 10-079705 | 3/1998 |
| JP | 10-178397 | 6/1998 |

OTHER PUBLICATIONS

Hirano, et al., "Dispersion Tolerant 80 Gbit/s Optical–Time–Division–Multiplexing Using a Duty–and Phase–Ctonrol Technique", Proceedings of the 1999 Communications Society Conference of IEICE, B–10–55 (1999).

"Chirp–compensated 40GHz semiconductor modelocked lasers integrates with chirped gratings", *Electronics Letters*, vol. 34, No. 20, Oct. 1, 1998.

"80–Gb/s (2×40–Gb/s) Transmission Experiments Over 667–km Dispersion–Shifted Fiber Using Ti:LiNbO$_3$ OTDM Modulator and Demultiplexer", 22$^{nd}$ *European Conference onOptical Communication—ECOC '96*, pp. 5.37–5.40.

"Temperature Derpendence of Chromatic Dispersion in Dispersion–Shifted fibers: Experiment and Analysis", *J. Appl. Phys.* 73 (5), Mar. 1, 1993, pp. 2069–2074.

* cited by examiner

*Primary Examiner*—Leslie Pascal  
*Assistant Examiner*—Dalzid Singh  
(74) *Attorney, Agent, or Firm*—Brenda O. Holmes; Kilpatrick Stockton LLP

(57) ABSTRACT

An optical transmitter for realizing a high tolerance with respect to the group velocity dispersion of the optical fibers, a small receiver sensitivity degradation, and an improved stability that is hardly affected by the group velocity dispersion even in the case of network scale expansion, is constructed by a light source section for generating optical clock pulses synchronized with a signal bit rate while maintaining a duty ratio of the optical clock pulses constant, which is capable of variably setting the duty ratio, and an encoding section for encoding the optical clock pulses by using electric signals synchronized with the optical clock pulses while setting a relative optical phase difference between the optical clock pulses in adjacent time-slots to be an odd integer multiple of $\pi$.

20 Claims, 30 Drawing Sheets

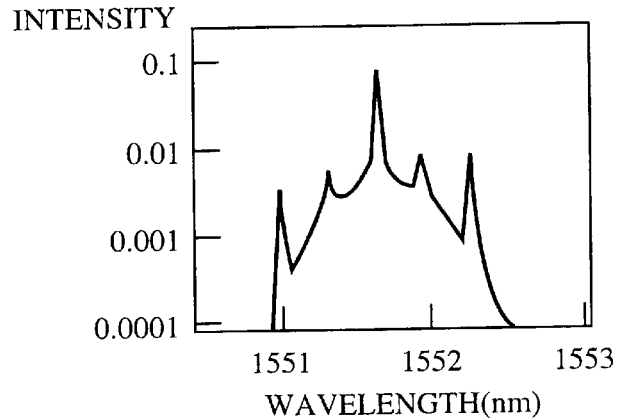
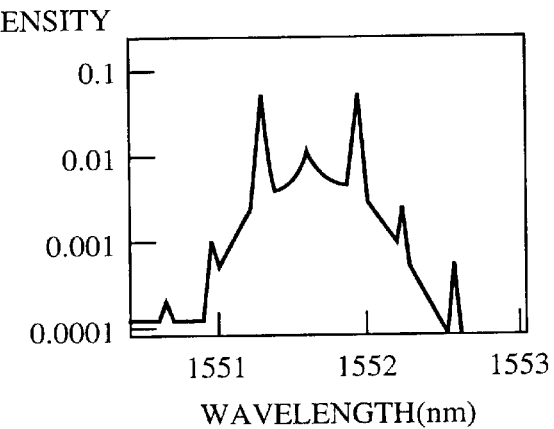
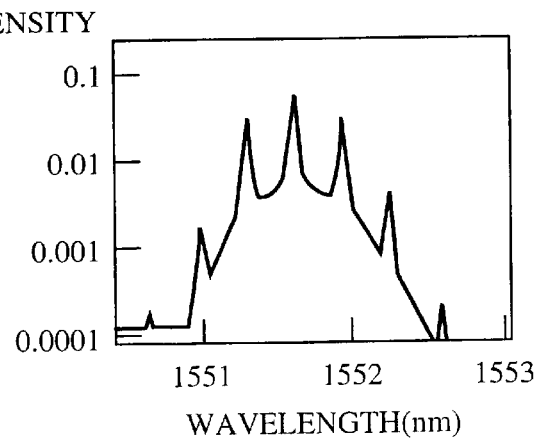
FIG. 10

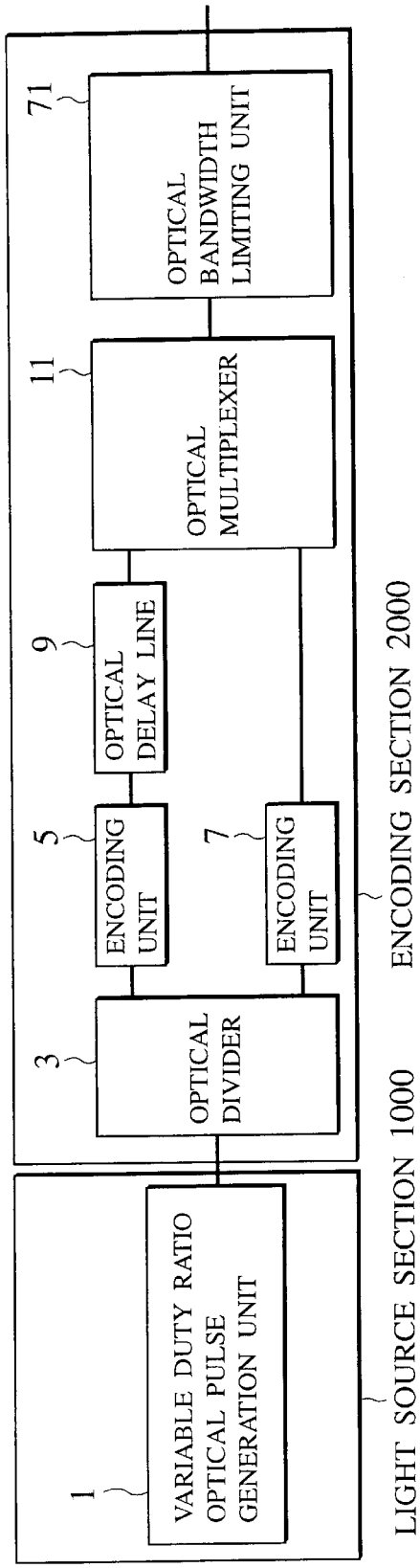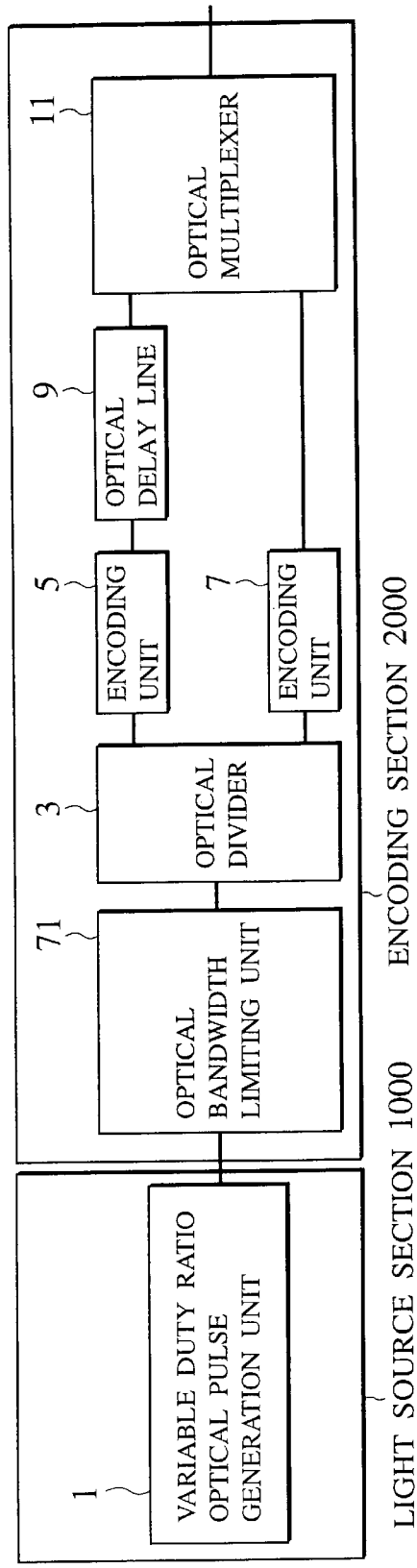

FIG.20
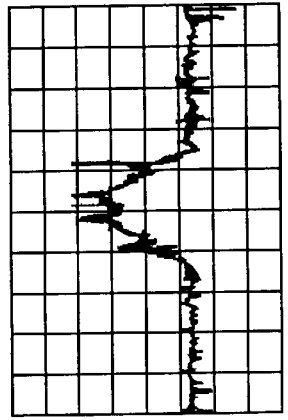 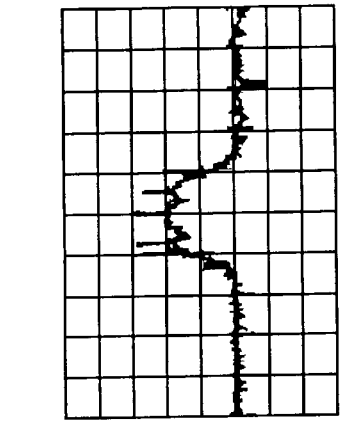
OPTICAL SPECTRUM
 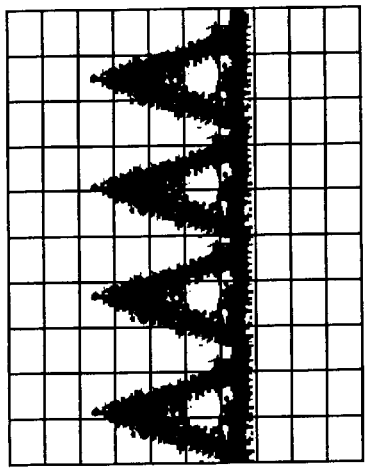
OPTICAL WAVEFORM
RELATIVE OPTICAL PHASE DIFFERENCE=π
RELATIVE OPTICAL PHASE DIFFERENCE=0

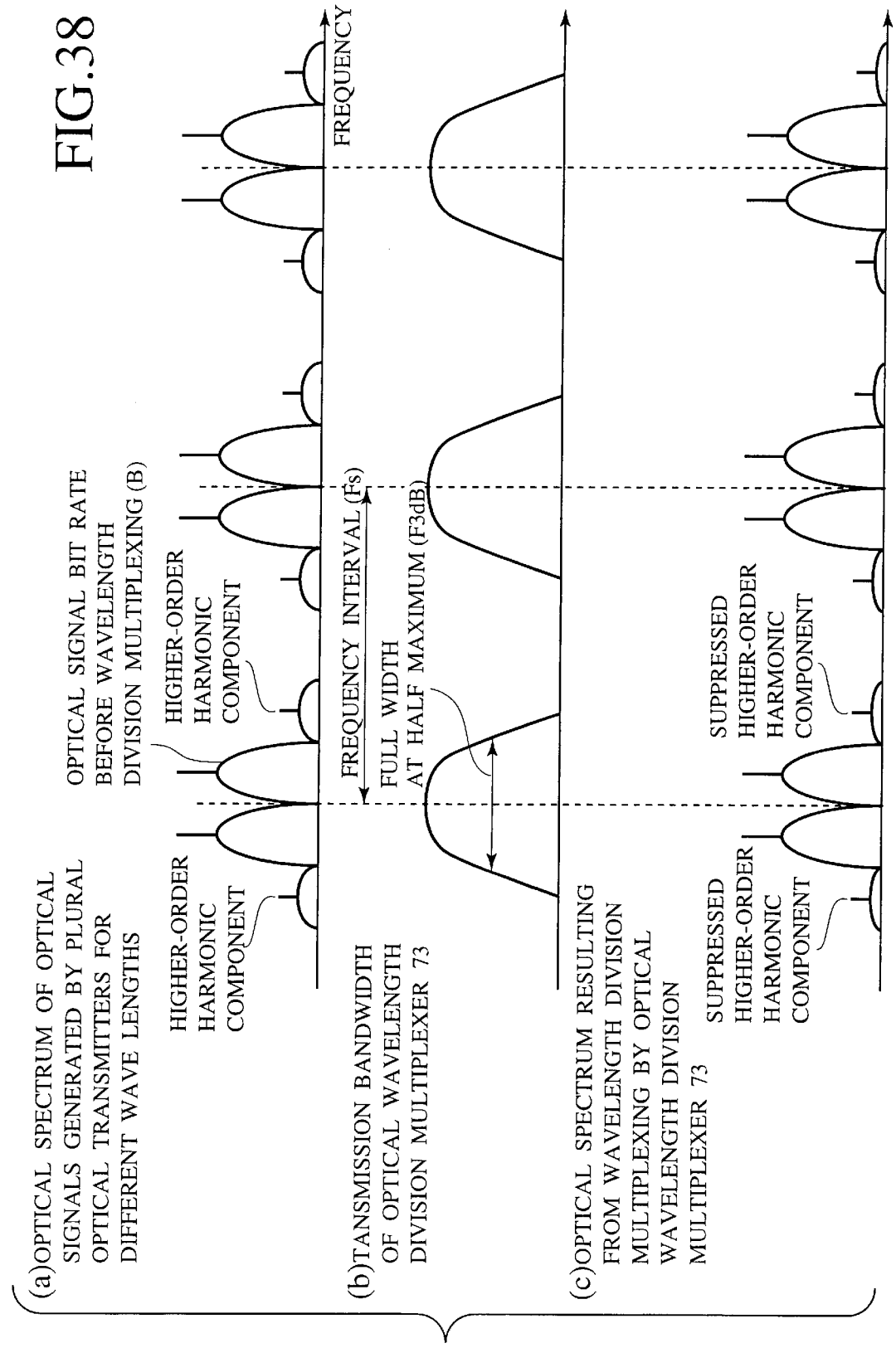

OPTICAL TRANSMITTER AND OPTICAL TRANSMITTER CONTROL METHOD USING VARIABLE DUTY RATIO SETTING AND ALTERNATE PHASE INVERSION FOR OPTICAL CLOCK PULSES

BACKGROUND OF THE INVENTION

1. FIELD OF THE INVENTION

The present invention relates to an optical transmitter for generating optical signals to be transmitted through transmission media such as optical fibers having chromatic dispersion that can degrade transmission quality, and a method for controlling such an optical transmitter.

2. DESCRIPTION OF THE BACKGROUND ART

In the optical transmission system, the degradation of transmission quality caused by the waveform distortion due to chromatic dispersion of the optical fibers that are used as transmission media is of great concern. This phenomenon occurs when an optical pulse width is increased to cause interferences with respect to neighboring time-slots as a bandwidth of optical signals is affected by the group velocity dispersion of the optical fibers.

FIG. 1 shows a prior art as disclosed in Japanese Patent Application Laid Open No. 10-79705 (1998). This prior art reference proposes an optical modulation apparatus in which the group velocity dispersion is cancelled by applying a pre-chirp to optical signals at a transmitter, so as to suppress the degradation due to the group velocity dispersion. In this proposition, the waveform distortion at a receiving end is suppressed by applying a frequency chirp in an amount that nearly matches the group velocity dispersion of the optical fibers at an optical transmitter in advance.

In FIG. 1, the continuous-wave light generated by a light source 101 is divided into two optical clocks by a clock generator 102. This clock generator 102 can be a Mach-Zehnder optical modulator, for example, which is to be driven by, sinusoidal wave electric signals. At this point, a value and a sign of the chirping are controlled by controlling a bias voltage to be applied to the optical modulator or the like at the pre-chirp unit 106. Also, in the case of using an electro-absorption optical modulator as the clock generator 102, the amount of the chirping is adjusted by controlling the bias voltage to be applied to the electro-absorption optical modulator at the pre-chirp unit 106. Then, the chirp controlled optical clocks are encoded by first and second data modulators 103 and 104 provided as next stage optical modulators, and then multiplexed by an optical multiplexer 105 to obtain desired optical signals.

However, in this optical modulation apparatus, the frequency chirp in an amount for cancelling the group velocity dispersion is applied in advance so that a bandwidth of the optical signal spectrum is increased. The optical spectrum bandwidth is inversely proportional to the square of the tolerance with respect to the group velocity dispersion, so that the tolerance is progressively lowered when the bandwidth is increased. Consequently, this conventional scheme for applying the pre-chirp lowers the dispersion tolerance and thereby hampers a stable operation of a transmission system. In other words, the transmission quality will be degraded even by a slight difference in the group velocity dispersion.

Also, in the case of using the electro-absorption optical modulator as the clock generator 102, the non-linear dependency of the extinction ratio with respect to the bias voltage as shown in this prior art reference can cause a problem. Namely, when the bias voltage is changed in order to control the frequency chirp, the clock pulse width is also varied so that the optical spectrum bandwidth is also changed and the dispersion tolerance is also changed. These chirp and pulse width cannot be varied independently, so that it is also difficult to set a desired amount of the chirping stably.

In addition, there is a large optical power loss at a time of extracting clock light from continuous-wave light using a gate provided by a modulator in the clock generator 102, and the loss is further increased as two encoded clock lights extinguish each other due to the optical interference effect at a time of multiplexing at the optical multiplexer 105. This causes a decrease in the optical power at an output end of the optical modulation apparatus, which in turn causes a lowering of S/N ratio at a time of transmission.

FIG. 2 shows three graphs indicating a relationship between the dispersion tolerance and the chromatic dispersion of optical clock having a bit rate of 80 Gbit/s, using a relative optical phase of two encoded optical clocks at a time of multiplexing at an optical multiplexer as a parameter. When the bit rate is different, the absolute value of dispersion ($|D|$(ps/nm)) indicated on the horizontal axis is changed but a relative relationship regarding an amount of penalty with respect to the duty ratio and the relative optical phase difference remains the same. Here, "in-phase" is the case where the relative optical phase difference is 0 or integer multiple of $2\pi$, "out-of-phase" is the case where the relative optical phase difference is an odd integer multiple of $\pi$, and "middle-phase" is the case where the relative optical phase difference is $\pi/2$ or odd integer multiple of $\pi/2$.

As shown in FIG. 2, the degradation of receiver sensitivity becomes noticeable when the duty ratio is excessively increased. In other words, in order to realize both a high dispersion tolerance and a low receiver sensitivity degradation, there is a need to control the duty ratio optimally. However, in the prior art, the optical clock is generated using sinusoidal waves in a frequency equal to the bit rate before the multiplexing by setting the driving point at a linear portion of the modulator, and controlling this optical clock generation at a desired value will require the change of modulation level, which in turn will cause a problem of the extinction ratio degradation. Moreover, the signal waveform will be degraded due to the interference effect at a time of the multiplexing.

Also, Japanese Patent Application Laid Open No. 10-79705 (1998) discloses an exemplary case of driving by rectangular waves, but such a driving by rectangular waves widens the optical spectrum excessively so that the dispersion tolerance will be lowered. For this reason, it is expected that the influence of the group velocity dispersion of the optical fibers with respect to the transmission distance becomes more stringent. Also, a driving by sinusoidal waves can only realize excessively broad duty ratio, so that in the case where the number of divisions is 3 or more as shown in this prior art reference, it is difficult to generate practically effective optical signals because the interference effect between adjacent optical clocks is so large that they extinguish each other.

On the other hand, FIG. 3 shows another prior art as disclosed in Japanese Patent Application Laid Open No. 9-261207 (1997), in which outputs of optical modulators 111 and 112 are multiplexed at an optical multiplexer 113 while a low frequency signal generated by a low frequency oscillator 115 are superposed by a phase modulation to the optical signal in one of them, and a part of the optical signal after the multiplexing is monitored by an optical phase detection and control unit 116 and the phase control is carried out by an optical phase control unit 110 such that the intensity of the intensity modulated component of the low frequency signal in the monitored part becomes minimum, so as to automatically maintain the relative optical phase difference.

However, the minimum value control has a rather poor sensitivity so that it is inevitable to superpose the low frequency, signal at relatively large amplitude as already shown in this prior art reference. However, as already mentioned above, this amounts to displacing the relative optical phase difference from $\pi$ intentionally so that it approaches to the case of the relative optical phase difference equal to $\pi/2$ which is associated with the severe degradation of dispersion tolerance. In other words, this controlling itself causes the degradation of dispersion tolerance.

As described, in the conventional optical transmitter that attempts to suppress the degradation of transmission quality due to the group velocity dispersion by controlling the chirp applied to the optical clock at a time of generating the optical clock using sinusoidal waves or the like, there is a problem in that the excessively wide optical spectrum bandwidth will be occupied as the chirp is applied, so that the tolerance with respect to the group velocity dispersion becomes lower.

Also, even though the chirp can be controlled to be arbitrarily small by the push-pull driving of a push-pull type Mach-zehnder optical modulator, there is a problem that the duty ratio of the optical clock cannot be controlled.

In addition, when the electro-absorption optical modulator is used, there is a problem that it is difficult to apply a desired amount of the chirping because the amount of the chirping itself is large and the chirping parameter and the duty ratio are not independent. Moreover, there is also a problem that controlling the duty ratio arbitrarily will cause a large variation in the loss, so that a variation in the S/N ratio at a time of communication will be caused and a fluctuation in the transmission quality will be caused.

SUMMARY OF THE INVENTION

It is therefore an object of the present invention to provide an optical transmitter and an optical transmitter control method capable of realizing a high tolerance with respect to the group velocity dispersion of the optical fibers, a small receiver sensitivity degradation, and an improved stability that is hardly affected by the group velocity dispersion even in the case of network scale expansion.

According to one aspect of the present invention there is provided an optical transmitter, comprising: a light source section configured to generate optical clock pulses synchronized with a signal bit rate while maintaining a duty ratio of the optical clock pulses constant, which is capable of variably setting the duty ratio; and an encoding section configured to encode the optical clock pulses by using electric signals synchronized with the optical clock pulses while setting a relative optical phase difference between the optical clock pulses in adjacent time-slots to be an odd integer multiple of $\pi$.

According to another aspect of the present invention there is provided an optical transmission apparatus, comprising: a plurality of optical transmitters provided in parallel and set to output optical signals of mutually different optical wavelengths, each optical transmitter having a light source section configured to generate optical clock pulses synchronized with a signal bit rate while maintaining a duty ratio of the optical clock pulses constant, which is capable of variably setting the duty ratio, and an encoding section configured to encode the optical clock pulses by using electric signals synchronized with the optical clock pulses while setting a relative optical phase difference between the optical clock pulses in adjacent time-slots to be an odd integer multiple of $\pi$; and a wavelength division multiplexer configured to output signals obtained by wavelength division multiplexing the optical signals of mutually different optical wavelengths outputted from the plurality of optical transmitters.

According to another aspect of the present invention there is provided an optical transmitter control method, comprising the steps of: variably setting a duty ratio of optical clock pulses to a value that makes interferences between pulses small, using a configuration capable of variably setting the duty ratio; generating the optical clock pulses synchronized with a signal bit rate by maintaining the duty ratio constant; and encoding the optical clock pulses by using electric signals synchronized with the optical clock pulses while setting a relative optical phase difference between the optical clock pulses in adjacent time-slots to be an odd integer multiple of $\pi$.

Other features and advantages of the present invention will become apparent from the following description taken in conjunction with the accompanying drawings.

BRIEF DESCRIPTION OF THE DRAWINGS

FIG. 10 is diagrams showing exemplary output optical spectra for various phase conditions in the optical transmitter of FIG. 8.

FIG. 15 is a block diagram showing one exemplary configuration of an optical transmitter according to the fifth embodiment of the present invention.

FIG. 16 is a block diagram showing another exemplary configuration of an optical transmitter according to the fifth embodiment of the present invention.

FIG. 20 is diagrams showing optical waveforms and optical spectra in the optical transmitter of FIG. 18.

FIG. 38 is diagrams for explaining an operation of the optical transmission apparatus of FIG. 37.

DETAILED DESCRIPTION OF THE PREFERRED EMBODIMENTS

Now, the preferred embodiments of the optical transmitter and optical transmitter control method according to the present invention will be described with references to the drawings.

First, the major features of the optical transmitter and optical transmitter control method of the present invention will be briefly summarized.

Figure 4:
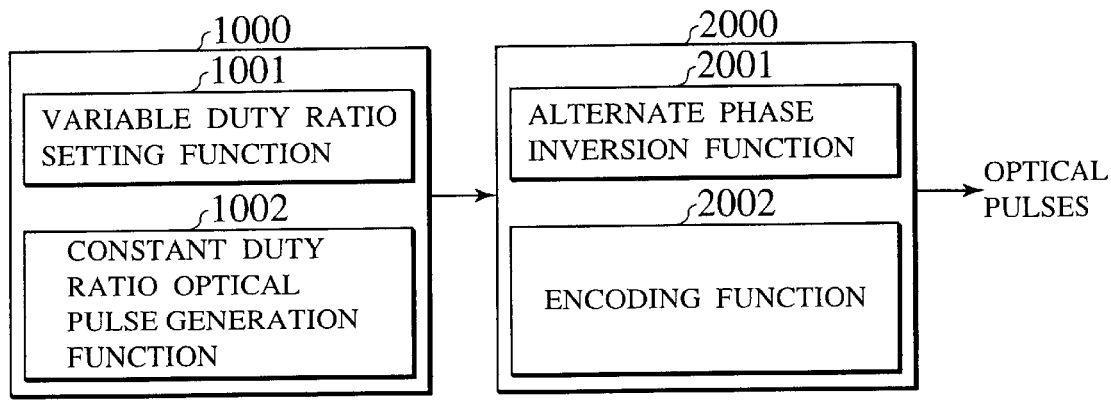
FIG. 4 is a block diagram showing a basic configuration of an optical transmitter of the present invention.

FIG. 4 shows a basic configuration of the optical transmitter of the present invention. This optical transmitter comprises a light source section 1000 for generating optical clock pulses synchronized with a signal bit rate,land an encoding section 2000 for encoding the optical clock pulses using electric signals synchronized with the optical clock pulses. The light source section 1000 has a variable duty ratio setting function 1001 for enabling a variable setting of the duty ratio of the optical clock pulses, and a constant duty ratio optical pulse generation function 1002 for generating the optical clock pulses synchronized with the signal bit rate at a constant duty ratio. The encoding section 2000 has an alternate phase inversion function 2001 for setting a relative optical phase difference between the optical clock pulses in adjacent time-slots to be an odd integer multiple of $\pi$, and an encoding function 2002 for encoding the alternate phase inverted optical clock pulses using the electric signals synchronized with the optical clock pulses.

Figure 5:
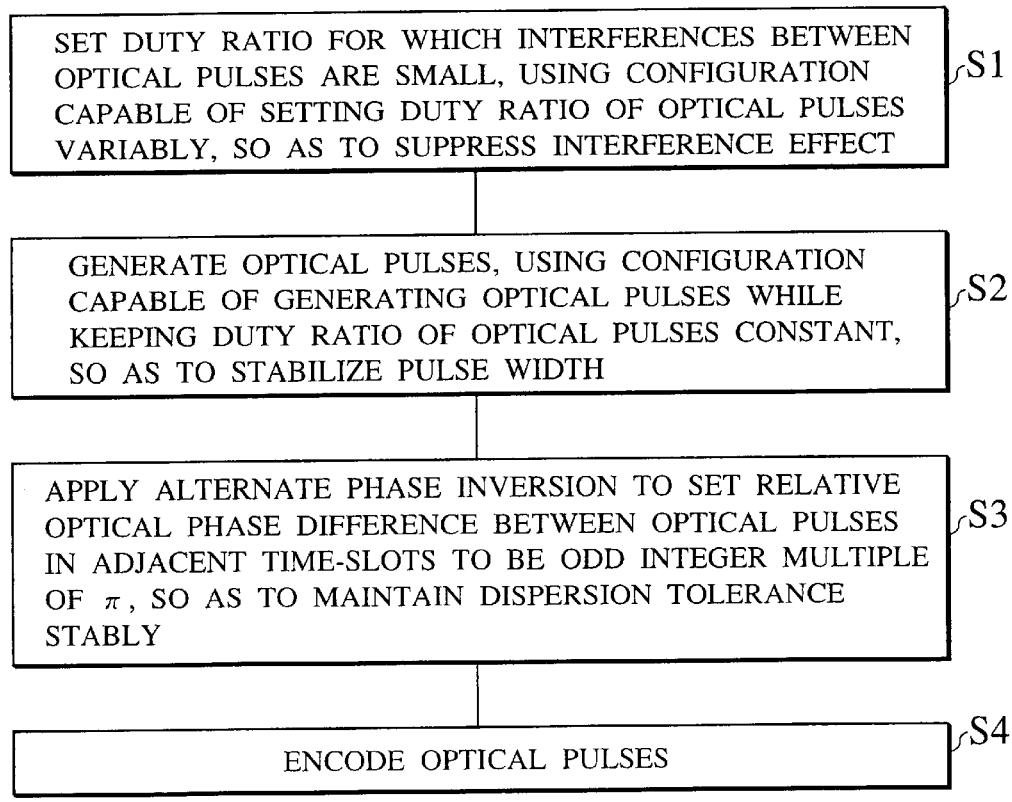
FIG. 5 is a flow chart showing a control procedure in an optical transmitter control method of the present invention.

In the optical transmitter control method of the present invention, the optical transmitter in such a configuration is controlled according to a procedure shown in FIG. 5 as follows.

First, using the variable duty ratio setting function 1001 of the light source section 1000 described above, the duty ratio of the optical clock pulses is set to a value that makes interferences between pulses small, so as to suppress the interference effect (step S1).

Then, using the constant duty ratio optical pulse generation function 1002 of the light source section 1000 described above, the optical clock pulses synchronized with the signal bit rate are generated while maintaining the duty ratio of the optical clock pulses constant, so as to stabilize the pulse width (step S2).

Then, using the alternate phase inversion function 2001 of the encoding section 2000 described above, the relative optical phase difference between the optical clock pulses in adjacent time-slots is set to be an odd integer multiple of $\pi$, so as to be able to maintain the dispersion tolerance stably (step S3).

Then:, using the encoding function 2002 of the encoding section 2000 described above, the alternate phase inverted optical clock pulses are encoded using the electric signals synchronized with the optical clock pulses (step S4).

In this way, the duty ratio can be set to an appropriate value that makes the interferences between pulses small because the duty ratio of the optical clock pulses is variable, so that it becomes possible to realize a setting for realizing both the high dispersion tolerance and a small receiver sensitivity degradation. In addition, it is also possible to maintain the high dispersion tolerance stably because the relative optical phase difference between the optical clock pulses in adjacent time-slots is set to an odd integer multiple of π.

Moreover, the pulse width is constant so that the amplitude after the equalization becomes stable and the eye opening degradation that can be seen in the conventional optical transmitter is completely eliminated. Furthermore, it is also possible to optimize the waveform of the optical clock pulses to a waveform with high dispersion tolerance, so that it becomes possible to raise the dispersion tolerance itself approximately twice as high as that of the conventional optical transmitter. Consequently, it is possible to provide an optical transmitter and an optical transmitter control method capable of realizing a high tolerance with respect to the group velocity dispersion of the optical fibers, a small receiver sensitivity degradation, and an improved stability that is hardly affected by the group velocity dispersion even in the case of network scale expansion, which are suitable for construction of larger scale networks.

Note that, in the following description, the setting of the relative optical phase difference between the optical clock pulses in adjacent time-slots, for instance, will be described as being set to an odd integer multiple of π or its vicinity, and descriptions of such a form are intended to account for the fact that the present invention is effective not only in the idealized case of setting the relative optical phase difference strictly equal to an odd integer multiple of π but also in the case of allowing some marginal errors in this setting. In such a case of allowing some marginal errors, the dispersion tolerance will be degraded from the idealized case, but the marginal errors for which the degradation of the dispersion tolerance is within 20% of the idealized case can be considered tolerable in practice, so that "vicinity" implies such marginal errors within a tolerable range.

Referring now to FIG. 6 to FIG. 34, the specific embodiments regarding more concrete configurations of the optical transmitter of FIG. 4 will be described.

Figure 6:
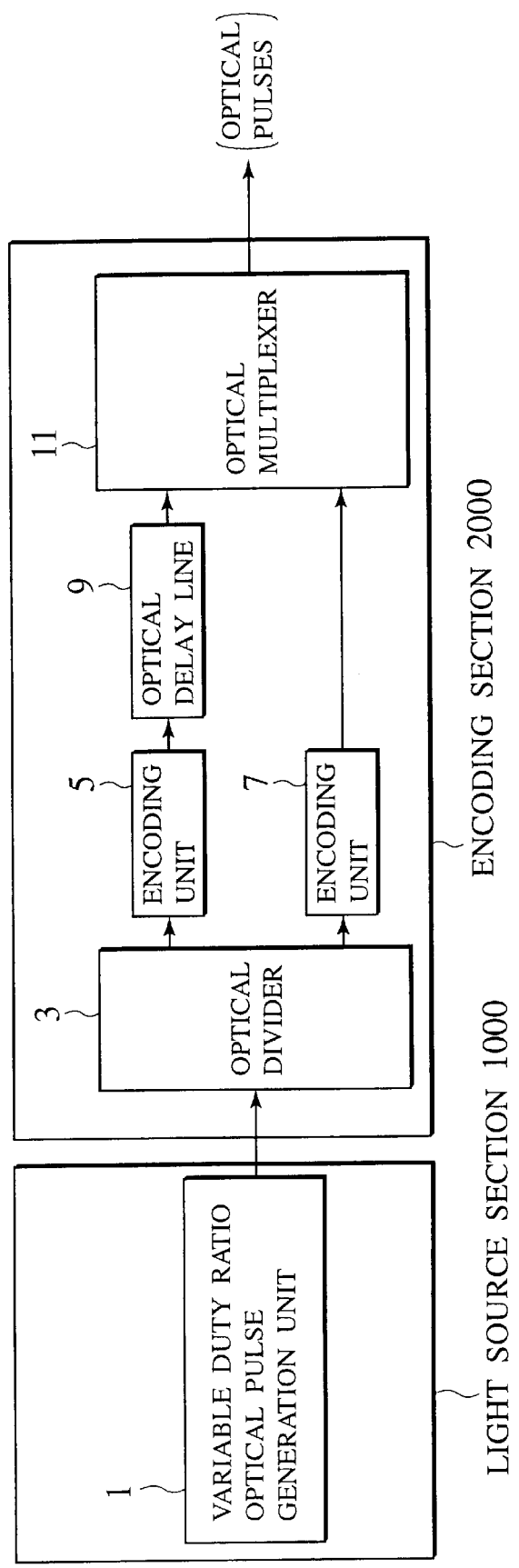
FIG. 6 is a block diagram showing a configuration of an optical transmitter according to the first embodiment of the present invention.

FIG. 6 shows a configuration of the optical transmitter according to the first embodiment of the present invention. The optical transmitter of FIG. 6 comprises a variable duty ratio optical pulse generation unit 1 for generating the optical clock pulses synchronized with the signal bit rate, in which the duty ratio can be set variably, an optical divider 3 for dividing the optical clock pulses generated from the variable duty ratio optical pulse generation unit 1, first and second encoding units 5 and 7 for encoding respective output signals divided by the optical dividing unit 3, an optical delay line 9 for delaying an output signal encoded by the first encoding unit 5, and an optical multiplexer 11 for multiplexing an output signal delayed by the optical delay line 9 and an output signal from the second encoding unit 7.

Here, the variable duty ratio optical pulse generation unit 1 constitutes the light source section 1000 described above, while the optical divider 3, the first and second encoding units 5 and 7, the optical delay line 9 and the optical multiplexer 11 constitute the encoding section 2000 described above.

In the optical transmitter of such a configuration, the optical pulses generated by the variable duty ratio optical pulse generation unit 1 are divided into two by the optical divider 3. At this point, the dividing ratio is 1:1. The divided optical pulses are independently encoded by the first and second encoding units 5 and 7, respectively. An encoding bit rate used here is equal to the repetition frequency of the optical pulses. Among these divided and encoded optical pulses, one component is given a delay corresponding to a time for an odd integer multiple of a half of the repetition period of the optical pulses or its vicinity by the optical delay line 9. The amount of delay used here is set such that the relative optical phase difference between two divided and encoded components becomes an odd integer multiple of π or its vicinity at a time of multiplexing them at the optical multiplexer 11.

Here, the variable duty ratio optical pulse generation unit 1 is a laser light source such as a modulator-integrated mode-locked laser diode (see K. Sato et al., Electronics Letters Vol. 34, No. 20, pp. 1944–1946, October 1998), a fiber-ring mode-locked laser, or a super-continuum light source (which will be collectively referred to as a mode-locked laser type light source hereinbelow). It is also possible to use a combination of such a mode-locked laser type light source and an optical band-pass filter such that: the bandwidth limiting can be carried out and the duty ratio can be controlled. The optical divider 3 is a Y-branching, a directional coupler or the like. Each of the encoding units 5 and 7 is a Mach-Zehnder interferometer type modulator using a Y-branching or a directional coupler, or an electro-absorption modulator. The optical delay like 9 is a delay line or the like. The optical multiplexer 11 is a Y-branching, a directional coupler or the like. Note that the above described optical components may be conveniently fabricated on an LN (Lithium-Niobate) or PLC (Planar-Lightwave-Circuit) substrate.

Next, with reference to FIG. 7, the optical transmitter of FIG. 6 will be described in further detail. An upper half of FIG. 7 shows a circuit configuration which is a specific configuration of the optical transmitter of FIG. 6, while a lower half of FIG. 7 shows waveforms in various parts of the optical transmitter of FIG. 7.

Figure 7:
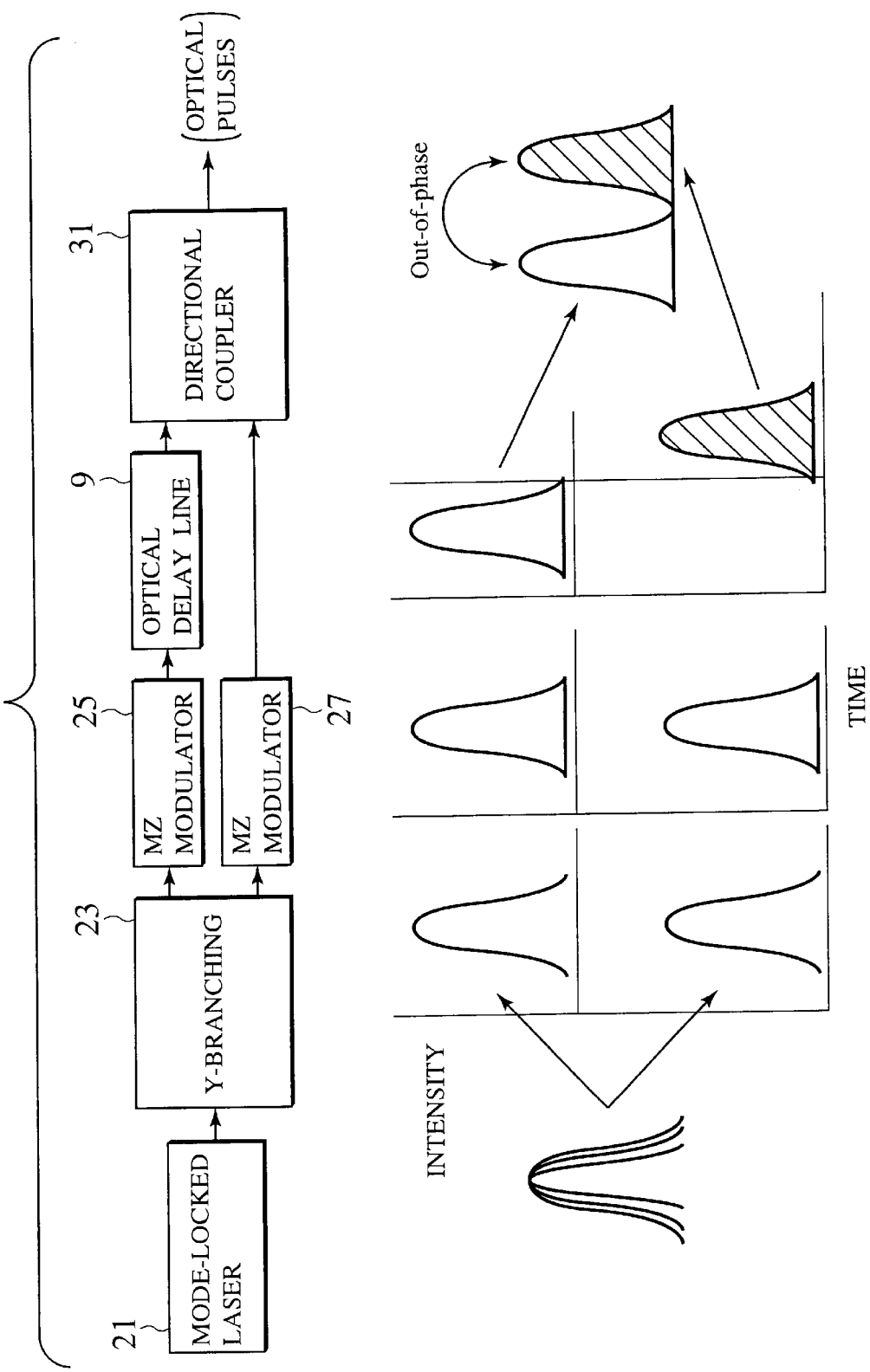
FIG. 7 is a diagram showing a specific configuration of the optical transmitter of FIG. 6 and waveforms at various parts.

In the optical transmitter shown in an upper half of FIG. 7, the variable duty ratio optical pulse generation unit 1 is formed by a semiconductor mode-locked laser 21, the optical divider 3 is formed by a Y-branching 23, the first and second encoding units 5 and 7 are formed by first and second Mach-Zehnder interferometer type (MZ) modulators 25 and 27, and the optical multiplexer 11 is formed by a directional coupler 31.

In the optical transmitter of FIG. 6 and FIG. 7, the optical pulses without a frequency chirp in the desired duty ratio are generated by the variable duty ratio optical pulse generation unit 1 formed by the semiconductor mode-locked laser 21. The generated optical pulses are entered into the optical divider 3 formed by the Y-branching 23, and divided into two at the dividing ratio of 1:1. The divided optical pulses are respectively encoded by the encoding units 5 and 7 formed by the Mach-Zehnder interferometer type (MZ) modulators 25 and 27 which are driven by NRZ (Non-Return-to-Zero) codes, so as to produce RZ (Return-to-Zero) codes. The driving NRZ codes are synchronized with the optical pulses after the division.

Among the encoded optical pulses, one component is delayed for an odd integer multiple of a half of the repetition period of the optical pulses or its vicinity by the optical delay line 9, as indicated by the shaded waveform in FIG. 7. When the optical delay line 9 has a built-in heater, the amount of delay can be controlled at high precision that is less than or equal to a wavelength of the light, using the thermo-optical effect by controlling the power conduction to the heater. By this precision delay control utilizing the thermo-optical effect, the relative optical phase difference between the two divided optical pulses at the optical multiplexer 11 formed by the directional coupler 31 is adjusted to be an odd integer multiple of π or its vicinity.

Figure 1:
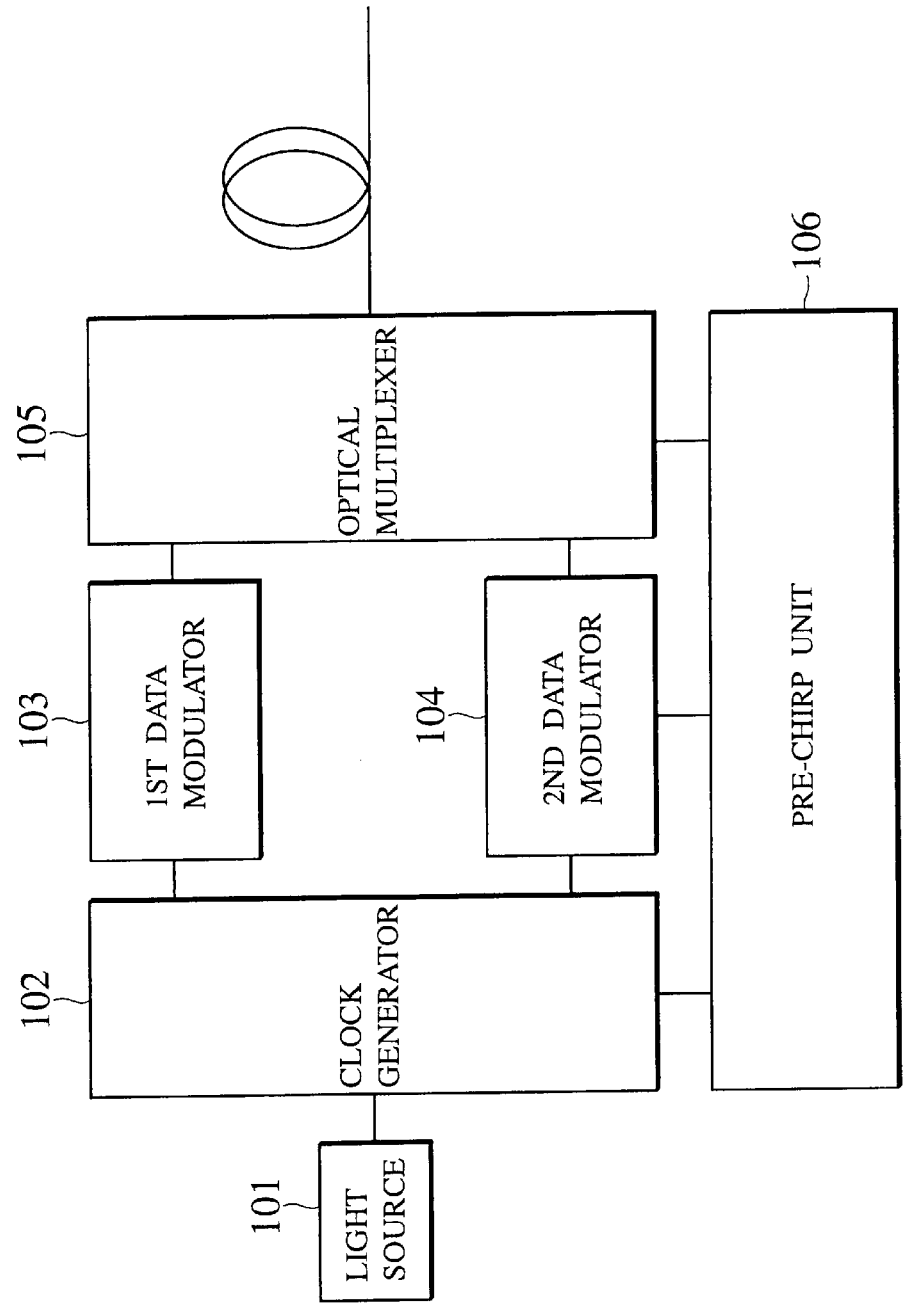
FIG. 1 is a block diagram showing a prior art disclosed in Japanese Patent Application Laid Open No. 10-79705 (1998).
Figure 2:
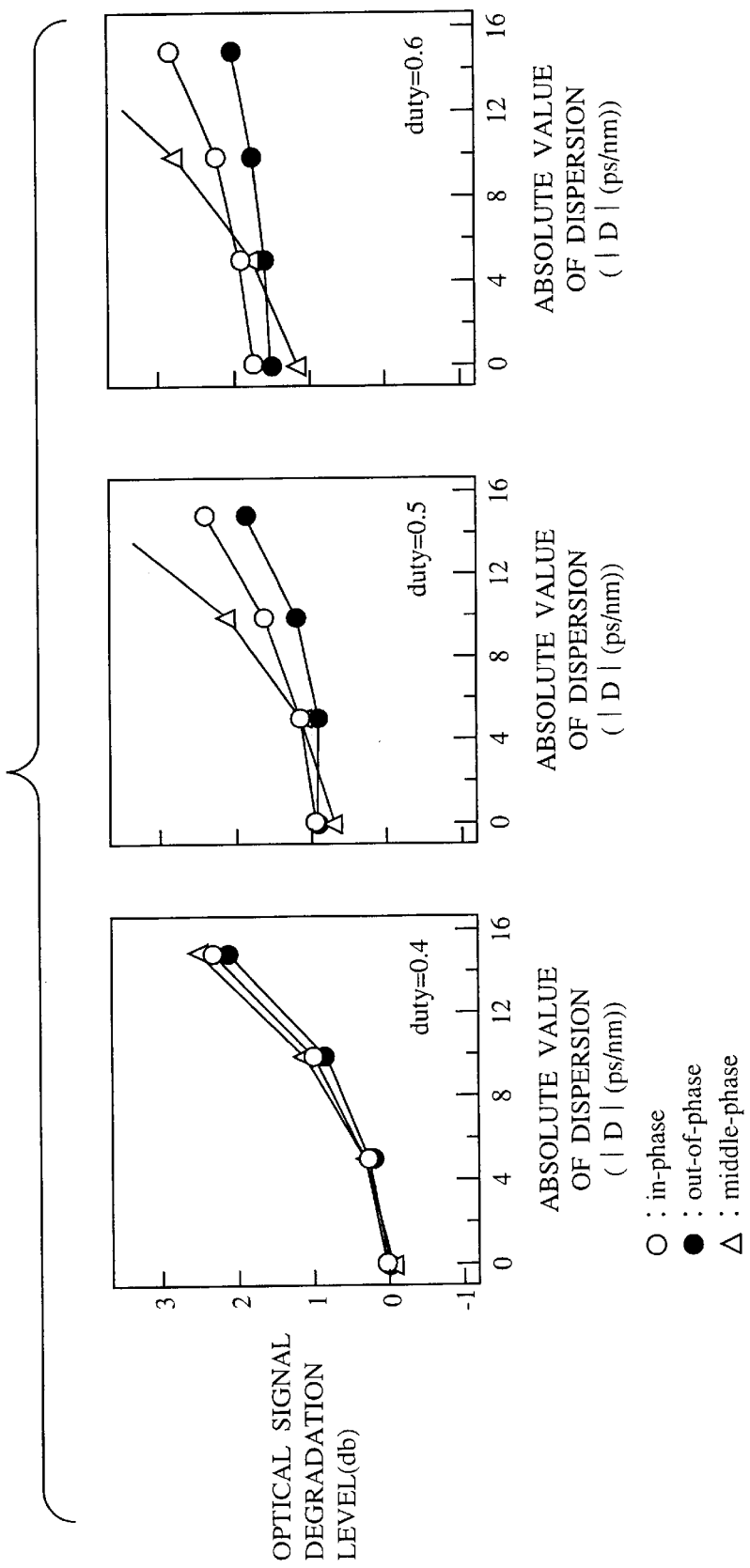
FIG. 2 is graphs showing a relationship between a chromatic dispersion of optical pulses and a dispersion tolerance at 80 Gbit/s.
Figure 3:
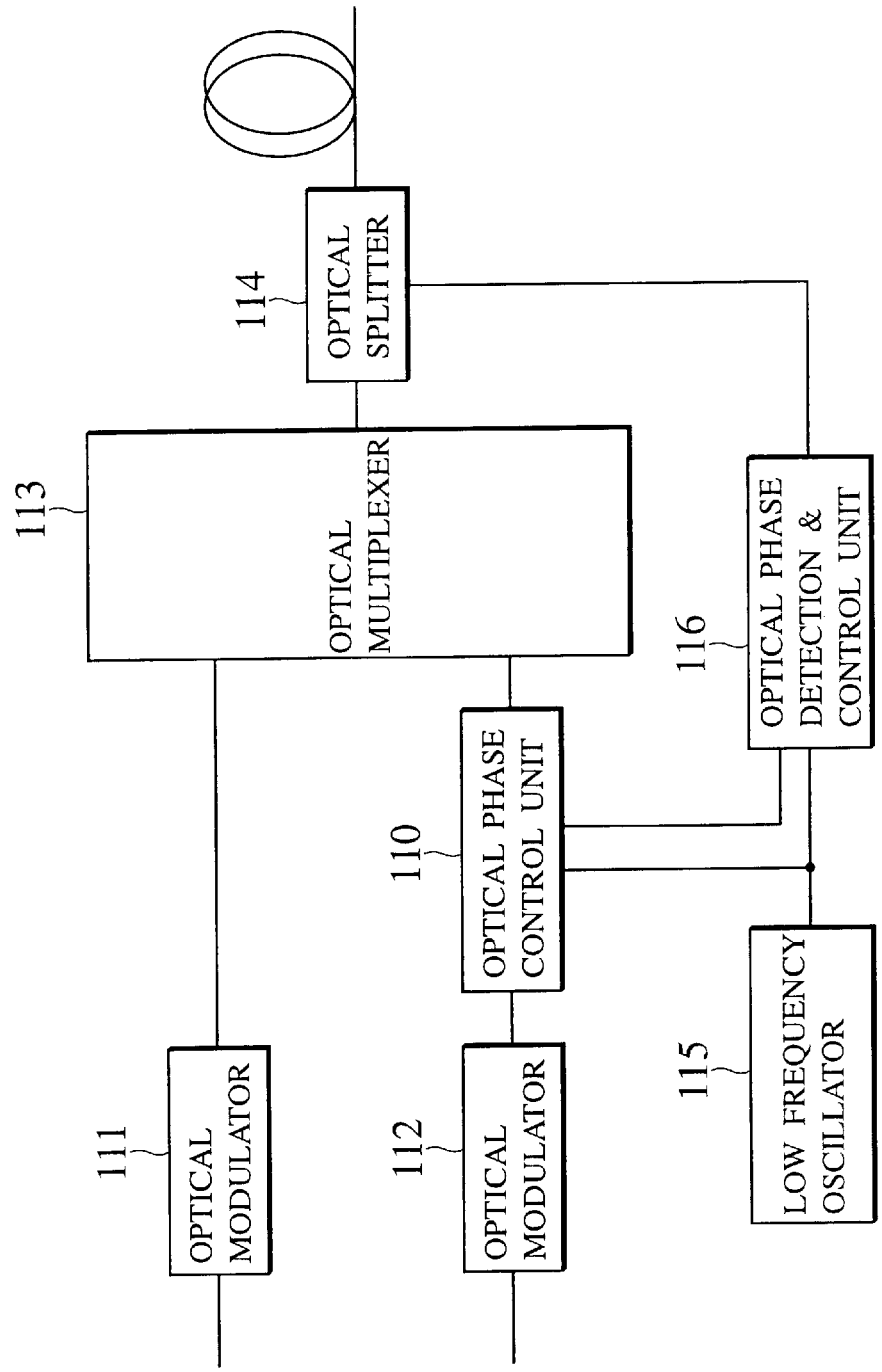
FIG. 3 is a block diagram showing another prior art disclosed in Japanese Patent Application Laid Open No. 9-261207 (1997).

In this way, the optical pulse outputted from the optical multiplexer 11 has a feature that the relative optical phase difference between the optical clock pulses in adjacent time-slots is always π. By this control, the "out-of-phase" condition shown in FIG. 2 is realized so as to realize the high dispersion tolerance. In addition, the receiver sensitivity degradation is small.

Figure 8:
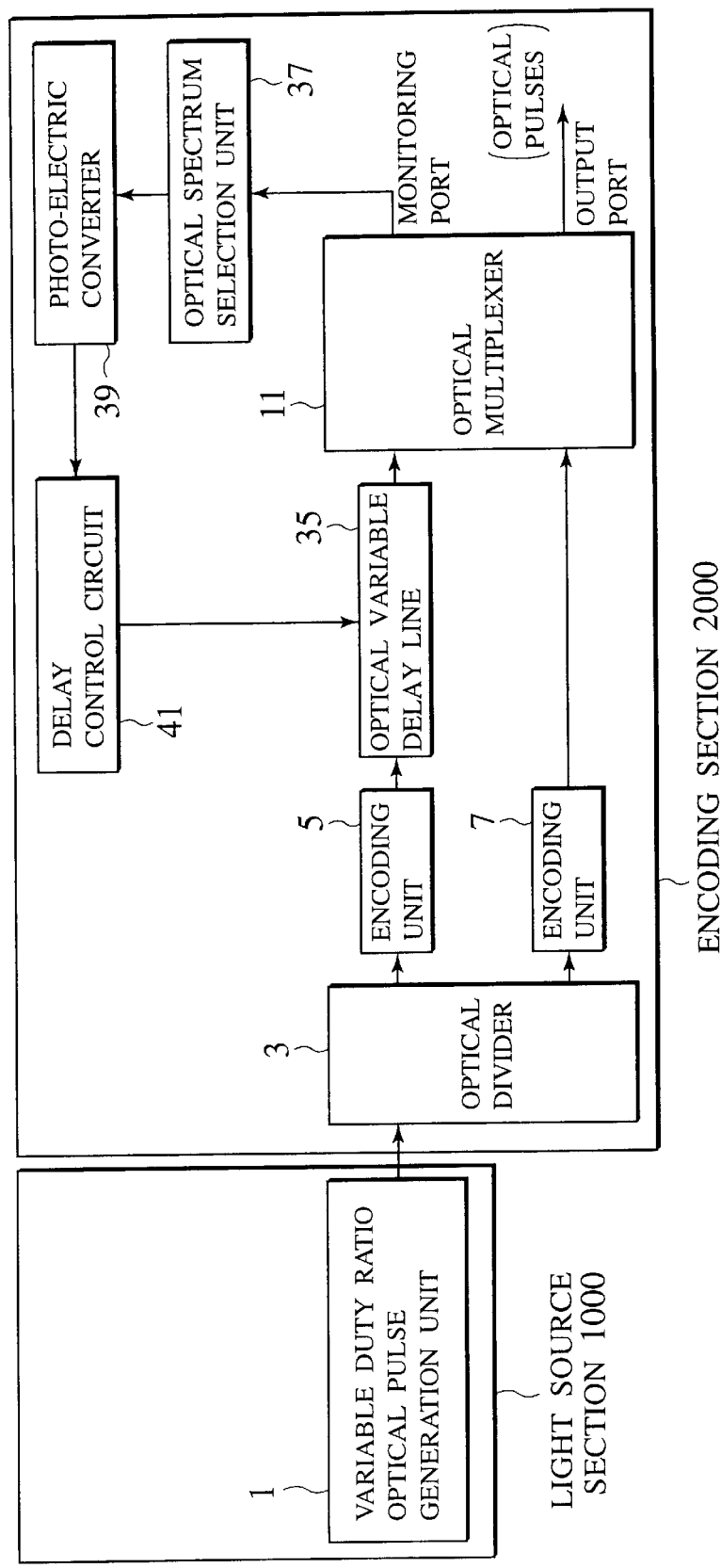
FIG. 8 is a block diagram showing a configuration of an optical transmitter according to the second embodiment of the present invention.

FIG. 8 shows a configuration of the optical transmitter according to the second embodiment of the present invention. The optical transmitter of FIG. 8 differs from the first embodiment shown in FIG. 6 in that an optical variable delay line 35 that can vary the delay time is used instead of the optical delay line 9 in the encoding section 2000, and that the encoding section 2000 is also provided with an optical spectrum selection unit 37 for splitting a part of the signal multiplexed by the optical multiplexer 11 from a monitoring port of the optical multiplexer 11 and selectively extracting only a central component of the optical spectrum, a photo-electric converter 39 for converting the central component of the optical spectrum extracted by the optical spectrum selection unit 37 into an electric signal, and a delay control circuit 41 for receiving this electric signal from the photo-electric converter 39 and controlling the optical variable delay line 35 such that the optical spectrum central component becomes maximum according to this electric signal.

In the optical transmitter of such a configuration, the optical pulses generated by the variable duty ratio optical pulse generation unit 1 are divided into two by the optical divider 3. At this point, the dividing ratio is 1:1. The divided optical pulses are independently encoded by the first and second encoding units 5 and 7, respectively. An encoding bit rate used here is equal to the repetition frequency of the optical pulses. Among these divided and encoded optical pulses, one component is given a delay corresponding to a time for an odd integer multiple of a half of the repetition period of the optical pulses or its vicinity by the optical variable delay line 35. The amount of delay used here is set such that the relative optical phase difference between two divided and encoded components becomes an odd integer multiple of π or its vicinity at a time of multiplexing them at the optical multiplexer 11.

The central component of the optical spectrum alone is extracted by the optical spectrum selection unit 37, and converted into an electric signal by the photo-electric converter 39. This electric signal is entered into the delay control unit 41 and the optical variable delay line 35 is controlled such that the optical spectrum central component becomes maximum.

Here, the optical spectrum selection unit 37 is a Fabry-Perot interferometer type optical filter, a dielectric multi-layer type optical filter, an arrayed waveguide, type optical filter, a Mach-Zehnder interferometer type optical filter or the like. The photo-electric converter 39 is a photo-diode, a photomultiplier tube, a CCD (Charge Coupled Device) or the like. The delay control circuit 41 is a suitable combination of an operational amplifier, an A/D converter, a calculator or the like.

Next, with reference to FIG. 9, the optical transmitter of FIG. 8 will be described in further detail. An upper half of FIG. 9 shows a circuit configuration which is a specific configuration of the optical transmitter of FIG. 8, while a lower half of FIG. 9 shows optical spectra obtained by extracting a part of lights at a monitoring port and an output port of the optical multiplexer 11 in the optical transmitter of FIG. 9.

Figure 9:
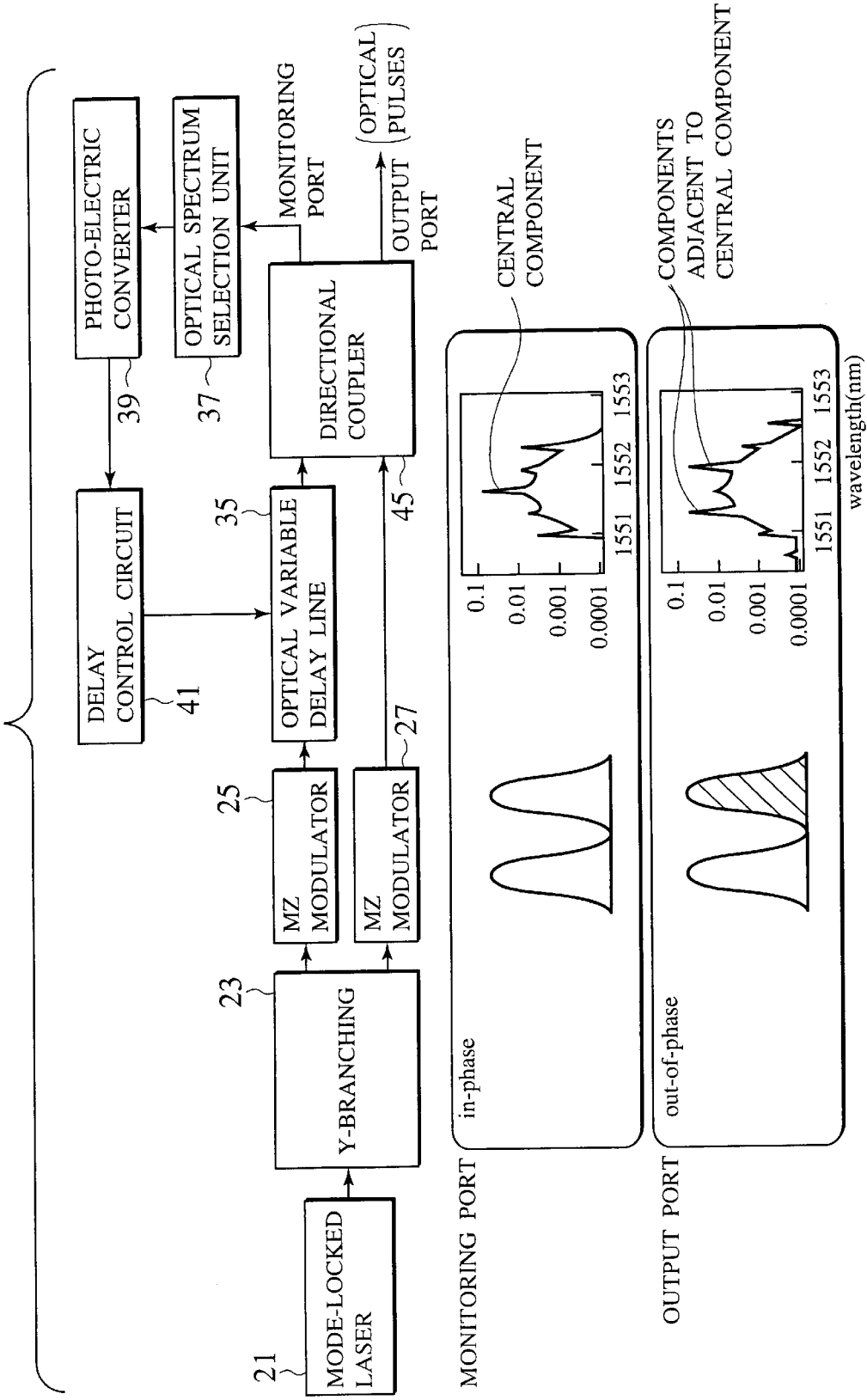
FIG. 9 is a diagram showing a specific configuration of the optical transmitter of FIG. 8 and optical spectra of a part of light extracted at a monitoring port and an output port of an optical multiplexer.

In the optical transmitter shown in an upper half of FIG. 9, similarly as in the case of FIG. 7, the variable duty ratio optical pulse generation unit 1 is formed by a semiconductor mode-locked laser 21, the optical divider 3 is formed by a Y-branching 23, the first and second encoding units 5 and 7 are formed by first and second Mach-Zehnder interferometer type (MZ) modulators 25 and 27, and the optical multiplexer 11 is formed by a directional coupler 45. In this embodiment, a Mach-Zehnder interferometer combined with the directional coupler 45 will be used as the optical multiplexer 11.

FIG. 10 shows exemplary optical spectra at a time of extracting a part of the lights at the monitoring port and the output port of the optical multiplexer 11 in the optical transmitter of FIG. 9, where parts (a), (b) and (c) of FIG. 10 show the cases where the relative optical phase difference between optical pulses divided by the optical divider 3 is 0, π, and π/2, respectively. In order to realize the high dispersion tolerance, this phase difference needs to be π or an odd integer multiple of π, and in such a case the optical spectrum has a form in which the central component is suppressed as shown in a part (b) of FIG. 10.

In this Mach-Zehnder interferometer, a port that is paired with the output port will output the optical pulse with the inverted optical phase. Consequently, the central component becomes largest at the monitoring port in this state. For this reason, the phase difference of an odd integer multiple of π or its vicinity can be maintained at the output port by making the central component maximum at the monitoring port.

Thus the central component is extracted by the optical spectrum selection unit 37, converted into an electric signal by the photo-electric converter 39, and the optical variable delay line 35 is controlled to make a signal intensity of this electric signal maximum. By this feedback control, it becomes possible to realize the high dispersion tolerance stably even when the phases of the two divided optical pulses fluctuate.

In this regard, it is to be noted that the prior art disclosed in Japanese Patent Application Laid Open No. 9-261207 (1997) mentioned above uses a control in which the optical power variation due to the extinction at overlapping portions of the optical pulses to be multiplexed is detected and minimized. However, this variation only accounts for a difference between the case where the overlapping portions of the optical pulses extinguish each other and the case where they intensify each other, so that the S/N ratio is low and therefore the precision of the control is poor. In addition, there also arises a problem that the sensitivity becomes different for different duty ratio values.

In contrast, this embodiment uses a control in which the central component alone is extracted by the optical band-pass filter and maximized, so that the S/N ratio is high so that the control at high precision is possible. Moreover, the variation of the sensitivity for different duty ratio values is very small.

The other basic operations in this second embodiment are the same as in the first embodiment.

In the above described operation, the feedback control is carried out to make the central component at the monitoring port maximum, but instead of that, it is also possible to carry out a control in which a part of the optical signal component from the output port is monitored and the central component of the optical spectrum is minimized. It is also possible to carry out a control in which a part of the optical signal component from the output port or the monitoring port is monitored and line spectra adjacent to the central component of the optical spectrum are maximized or minimized.

Figure 11:
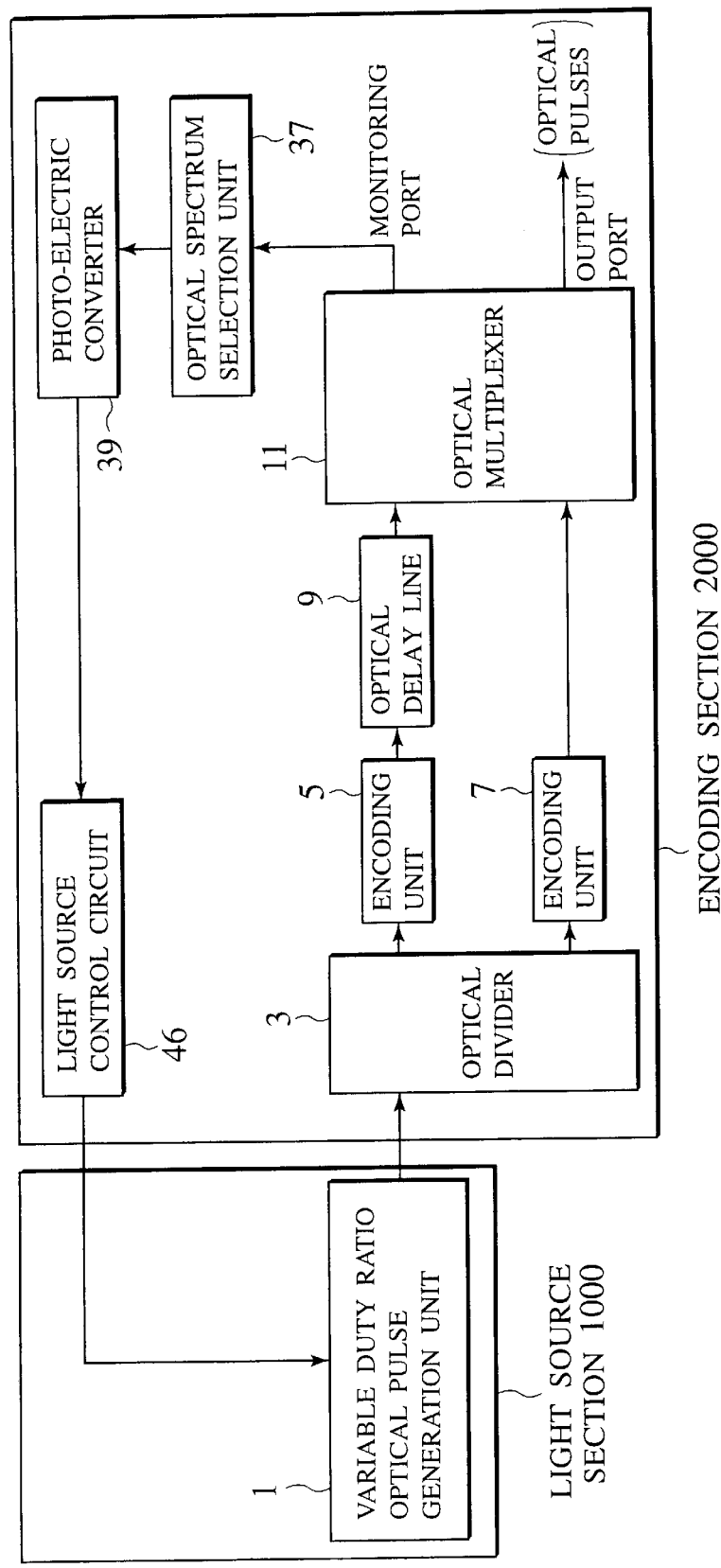
FIG. 11 is a block diagram showing a configuration of an optical transmitter according to the third embodiment of the present invention.

FIG. 11 shows a configuration of the optical transmitter according to the third embodiment of the present invention. The optical transmitter of FIG. 11 differs from the second embodiment shown in FIG. 8 in that a light source control circuit 46 for controlling the variable duty ratio optical pulse generation unit 1 is provided in the encoding section 2000 instead of the delay control circuit 41 for controlling the optical variable delay line 35 while the optical variable delay line 35 is replaced by the optical delay line 9 similar to that of the first embodiment. The rest of the configuration and the operations are the same as the second embodiment of FIG. 8.

In the optical transmitter of FIG. 11, the optical pulses generated by the variable duty ratio optical pulse generation unit 1 are divided into two by the optical divider 3. At this point, the dividing ratio is 1:1. The divided optical pulses are independently encoded by the first and second encoding units 5 and 7, respectively. An encoding bit rate used here is equal to the repetition frequency of the optical pulses. Among these divided and encoded optical pulses, one component is given a delay corresponding to a time for an odd integer multiple of a half of the repetition period of the optical pulses or its vicinity by the optical delay line 9. The amount of delay used here is set such that the relative optical phase difference between two divided and encoded components becomes an odd integer multiple of $\pi$ or its vicinity at a time of multiplexing them at the optical multiplexer 11.

The central component of the optical spectrum alone is extracted by the optical spectrum selection unit 37, and converted into an electric signal by the photo-electric converter 39. This electric signal is entered into the light source control unit 46 and the wavelength of the variable duty ratio optical pulse generation unit 1 is controlled such that the optical spectrum central component becomes maximum.

Here, the optical spectrum selection unit 37 is a Fabry-Perot interferometer type optical filter, a dielectric multilayer type optical filter, an arrayed waveguide type optical filter, a Mach-Zehnder interferometer type optical filter or the like, which has a narrower bandwidth than that used in the second embodiment. This is because the higher precision is required for the detection of the wavelength variation. The photo-electric converter 39 is a photo-diode, a photomultiplier tube, a CCD or the like. The light source control circuit 46 is a suitable combination of an operational amplifier, an A/D converter, a calculator or the like.

Next, the optical transmitter of FIG. 11 will be described in further detail. Note that, in this embodiment, a Mach-Zehnder interferometer combined with a directional coupler will be used as the optical multiplexer 11.

Similarly as in the second embodiment, in this third embodiment of FIG. 11, the central component or the line spectra adjacent to the central component of the optical spectrum at the monitoring port or the output port should be maximized or minimized for the same reason as described in the second embodiment.

Thus the central component is extracted by the optical spectrum selection unit 37 having a narrower bandwidth than that used in the second embodiment, converted into an electric signal by the photo-electric converter 39, and the variable duty ratio optical pulse generation unit 1 is controlled to make a signal intensity of this electric signal maximum. By this feedback control, it becomes possible to maintain the oscillation wavelength of the variable duty ratio optical pulse generation unit 1 at a constant value stably.

In this regard, it is to be noted that there is a report indicating that a value of the group velocity dispersion of the optical fibers changes at 0.07 ps/nm$^2$/km depending on the wavelength (see K.S. Kim et al., Journal of Applied Physics, Vol. 73, No. 5, pp. 2069–2074, March 1993). For this reason, when the wavelength of the light source fluctuates, a value of the group velocity dispersion applied to the optical pulses also changes so that there is a possibility of causing the waveform distortion for the optical pulses that leads to the transmission quality degradation. By the control of this third embodiment, it becomes possible to prevent such a degradation so that the system reliability can be improved.

The other basic operations in this third embodiment 10 are the same as in the first and second embodiments.

Figure 12:
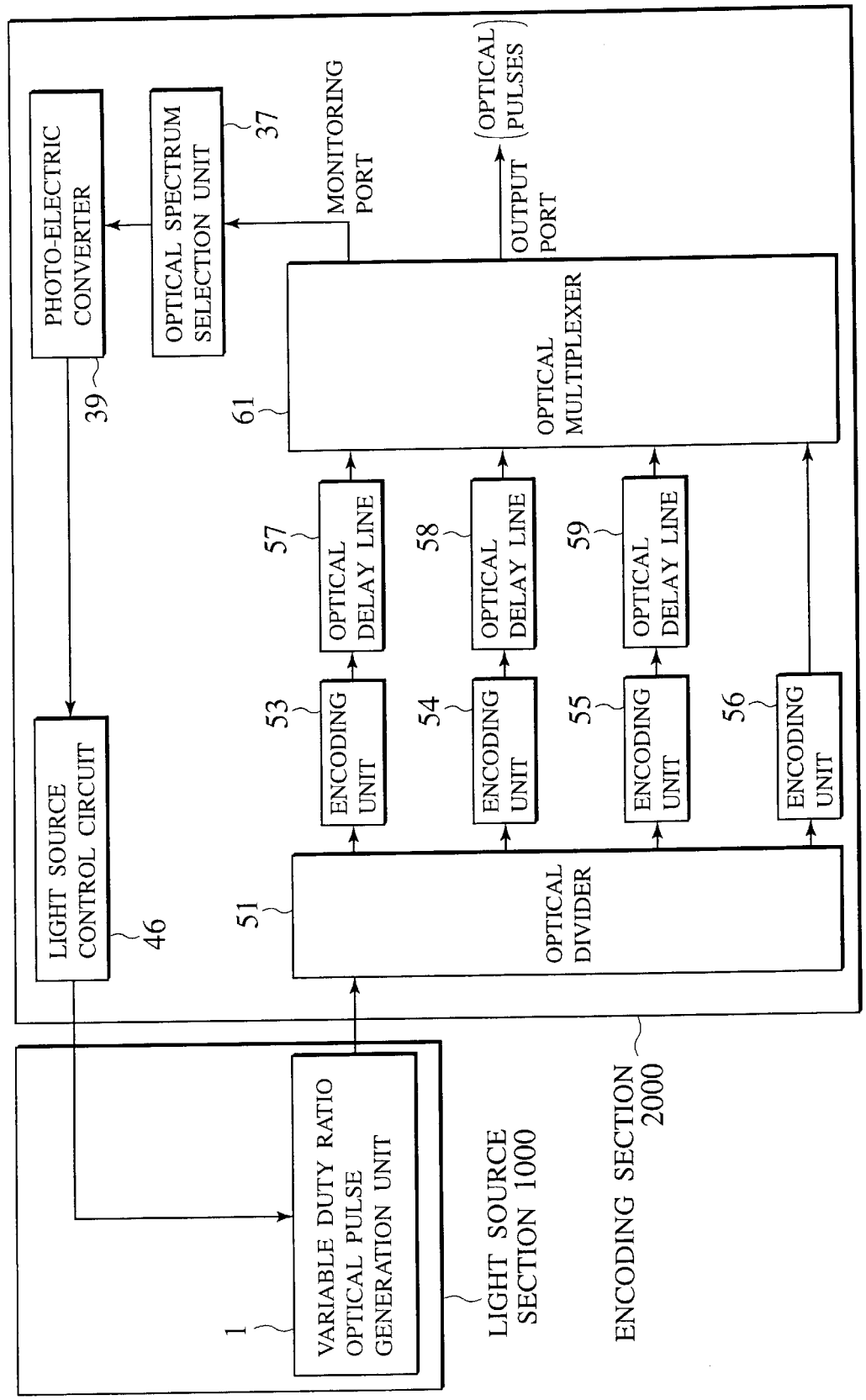
FIG. 12 is a block diagram showing a configuration of an optical transmitter according to the fourth embodiment of the present invention.

FIG. 12 shows a configuration of the optical transmitter according to the fourth embodiment of the present invention. The optical transmitter of FIG. 12 differs from the third embodiment shown in FIG. 11 in that, in the encoding section 2000, an optical divider 51 for dividing the optical clock pulses from the variable duty ratio optical pulse generation unit 1 into four is used instead of the optical divider 3, four encoding units 53–56 for respectively encoding four outputs of the optical divider 51 are used instead of the first and second encoding units 5 and 7, three optical delay lines 57–59 for delaying the output signals of only three encoding units 53–55 among the four encoding units 53–56 are used instead of the optical delay line 9, and an optical multiplexer 61 for multiplexing three output signals of the three optical delay lines 57–59 and the output signal of the fourth encoding unit 56 that is not delayed is used instead of the optical multiplexer 11. The rest of the configuration and the operations are the same as the third embodiment of FIG. 11.

In the optical transmitter of such a configuration, the optical pulses generated by the variable duty ratio optical pulse generation unit 1 are divided into four by the optical divider 51. At this point, the dividing ratio is 1:1:1:1. The divided optical pulses are independently encoded by the four encoding units 55–56, respectively. An encoding bit rate used here is equal to the repetition frequency of the optical pulses.

Figure 13:
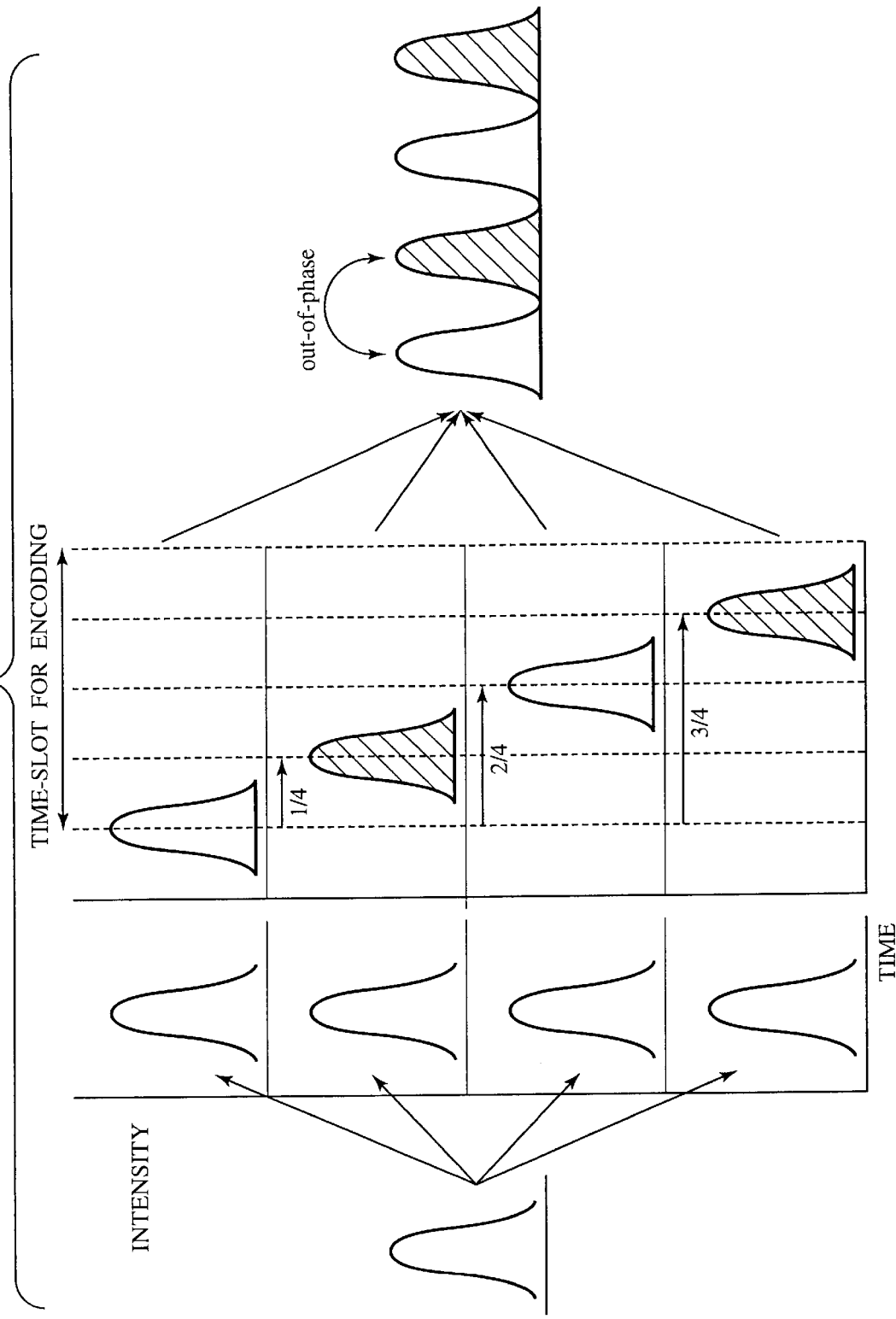
FIG. 13 is a diagram for explaining a manner of applying delays by optical delay lines in the optical transmitter of FIG. 12.

Among these divided and encoded optical pulses, at least three components are given delays. Namely, as shown in FIG. 13, the optical delay lines 57–59 apply delays given by 1/4, 2/4 and 3/4 times a time period of one time-slot for the encoding or an integer multiple of a time period of one time-slot for the encoding added to 1/4, 2/4 and 3/4 of a time period of one time-slot for the encoding, respectively. Note that, in general, delays to be applied by the optical delay lines are given by [(k/n)+m] (k=1, 2, . . . , (n−1), respectively) times a time period of one time-slot for the encoding, where n is the number of multiplexing and m is an arbitrary integer.

The amounts of delays used here are set such that the relative optical phase differences among four divided and encoded components become odd integer multiples of $\pi$ or their vicinity at a time of multiplexing them at the optical multiplexer 61.

The central component of the optical spectrum alone is extracted by the optical spectrum selection unit 37, and converted into an electric signal by the photo-electric converter 39. This electric signal is entered into the light source control unit 46 and the wavelength of the variable duty ratio optical pulse generation unit 1 is controlled such that the optical spectrum central component becomes maximum.

Here, the optical divider 51 is formed by three 2-branching optical divider, where the first one divides the input into two, which are then respectively divided into two by the other two, so as to realize the dividing into four. It is also possible to use a star coupler, a PLC circuit, or an LN waveguide that has 4-branching, for this optical divider 51.

The optical spectrum selection unit 37 is a Fabry-Perot interferometer type optical filter, a dielectric multi-layer type optical filter, an arrayed waveguide type optical filter, a Mach-Zehnder interferometer type optical filter or the like, which has a narrower bandwidth than that used in the second embodiment. This is because the higher precision is required for the detection of the wavelength variation. The photo-electric converter 39 is a photo-diode, a photomultiplier tube, a CCD or the like. The light source control circuit 46 is a suitable combination of an operational amplifier, an A/D converter, a calculator or the like.

Next, the optical transmitter of FIG. 12 will be described in further detail. Note that, in this embodiment, a directional coupler on PLC will be used as the optical multiplexer 61.

Similarly as in the second embodiment, in this fourth embodiment of FIG. 12, the central component or the line spectra adjacent to the central component of the optical spectrum at the monitoring port or the output port should be maximized or minimized for the same reason as described in the second embodiment.

Thus the central component at the monitoring port is extracted by the optical spectrum selection unit 37 having a narrower bandwidth than that used in the second embodiment, converted into an electric signal by the photo-electric converter 39, and the variable duty ratio optical pulse generation unit 1 is controlled to make a signal intensity of this electric signal maximum. By this feedback control, it becomes possible to maintain the oscillation wavelength of the variable duty ratio optical pulse generation unit 1 at a constant value stably. The effectiveness of this control is the same as that described above for the third embodiment.

The other basic operations in this fourth embodiment are the same as in the previous embodiments.

Figure 14:
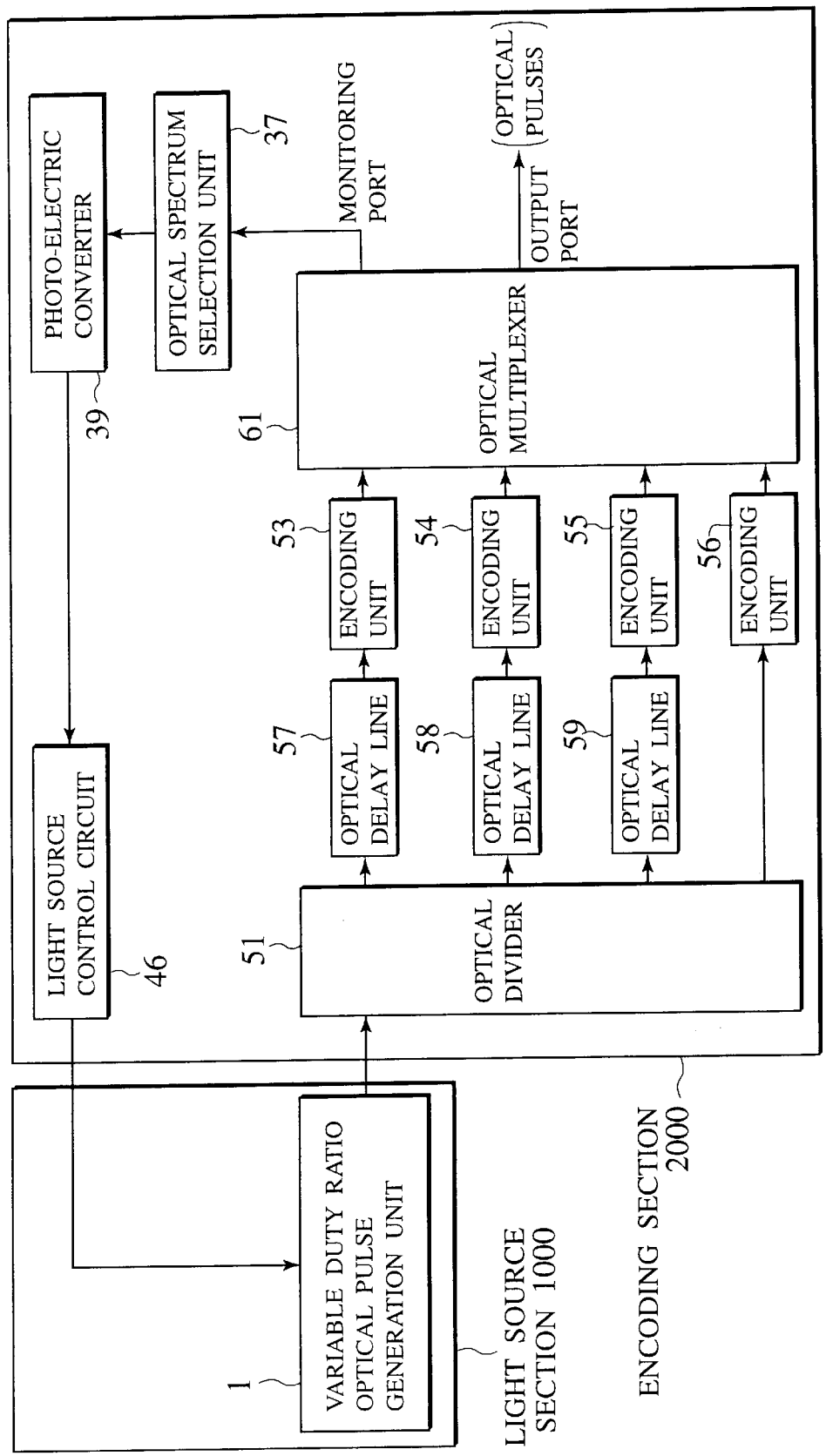
FIG. 14 is a block diagram showing a modified configuration of the optical transmitter of FIG. 12.

Note that, as shown in FIG. 14, it is possible to modify the configuration of FIG. 12 by interchanging the positional relationship of the four encoding units 53–56 and the three optical delay lines 57–59 such that three of the output signals of the optical divider 51 are delayed by the three optical delay lines 57–59 and then the three delayed output signals and the one non-delayed output signal of the optical divider 51 are respectively encoded by the four encoding units 53–56.

Also, in the above embodiments, the control of the optical variable delay line 35 and the control of the variable duty ratio optical pulse generation unit 1 are described separately, but it is also possible to use both of these controls simultaneously or selectively according to the need so as to realize the optical transmitter which is stable: and which has high tolerance with respect to the group velocity dispersion.

FIG. 15 shows a configuration of the optical transmitter according to the fifth embodiment of the present invention. The optical transmitter of FIG. 15 differs from the first embodiment shown in FIG. 6 in that, an optical bandwidth limiting unit 71 is provided after the optical multiplexer 11 in the encoding section 2000. The rest of the configuration and the operations are the same as the first embodiment of FIG. 6 so that the corresponding constituent elements are given the same reference numerals in FIG. 6 and FIG. 15.

The optical bandwidth limiting unit 71 has a transmission bandwidth that blocks components outside the necessary optical signal bandwidth, such that this optical bandwidth limiting unit 71 removes unnecessary higher-order harmonic components and thereby improves the spectral efficiency.

Note that, instead of providing the optical bandwidth limiting unit 71 on an output side of the optical multiplexer 71 as shown in FIG. 15, it is also possible to use a configuration as shown in FIG. 16 in which the optical bandwidth limiting unit 71 is provided at an output side of the variable duty ratio optical pulse generation unit 1. Even when the optical bandwidth limiting unit 71 is provided at an output side of the variable duty ratio optical pulse generation unit 1, it is also possible to suppress the unnecessary higher-order harmonic components similarly as in the case of FIG. 15.

Figure 17:
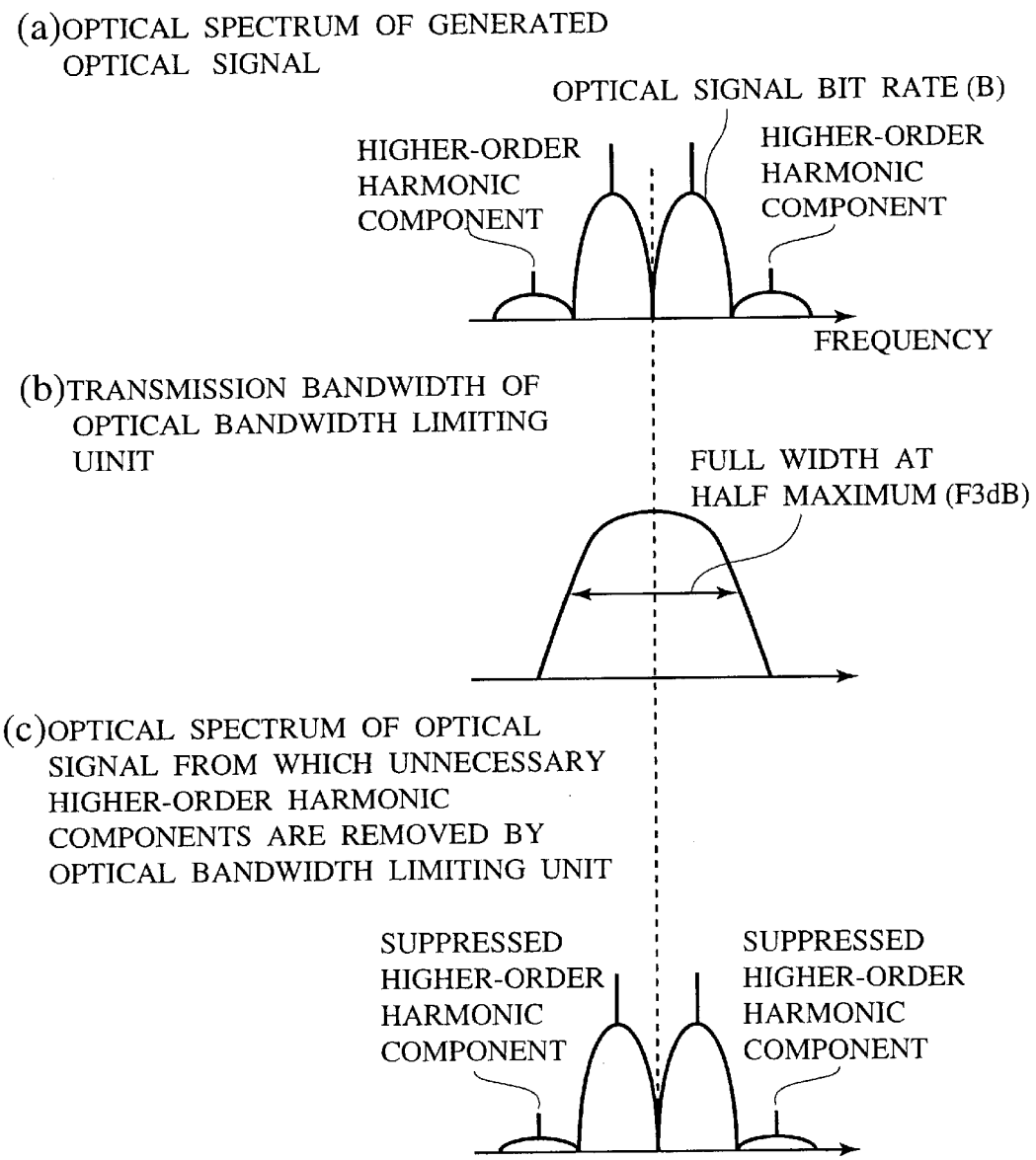
FIG. 17 is diagrams for explaining an operation of the optical transmitter of FIG. 15 and FIG. 16.

Next, with reference to FIG. 17, the optical transmitter of FIG. 15 or FIG. 16 will be described in further detail. FIG. 17 shows diagrams representing exemplary, optical spectra of the optical signals generated by the optical transmitter of FIG. 15 or FIG. 16.

As shown in a part (a) of FIG. 17, the unnecessary higher-order harmonic components appear on both outer sides of the necessary signal bandwidth indicated as the optical signal bit rate, at the variable duty ratio optical pulse generation unit 1 or the encoding unit 5 that constitutes the optical transmitter. The optical bandwidth limiting unit 71 has a transmission bandwidth characteristic for blocking these unnecessary higher-order harmonic components, that is, components outside the necessary optical signal bandwidth, as shown a part (b) of FIG. 17. Consequently, by providing the optical bandwidth limiting unit 71 having such a transmission bandwidth characteristic, it becomes possible to suppress the unnecessary higher-order harmonic components that are appearing on both outer sides as shown in a part (c) of FIG. 17. In this way, it is possible to prevent a lowering of the spectral efficiency that could have occurred as the generated optical signals occupy a bandwidth larger than the necessary bandwidth.

Note that the above embodiments can be easily adapted to the case of using the number of multiplexing greater than or equal to 3 by controlling the pulse width of the variable duty ratio optical pulse generation unit.

Note also that the above embodiments are described for the case of not delaying one of the divided optical pulses, but it is also possible to delay all of the divided optical pulses by setting relative delays among these optical pulses similarly as described above.

Figure 18:
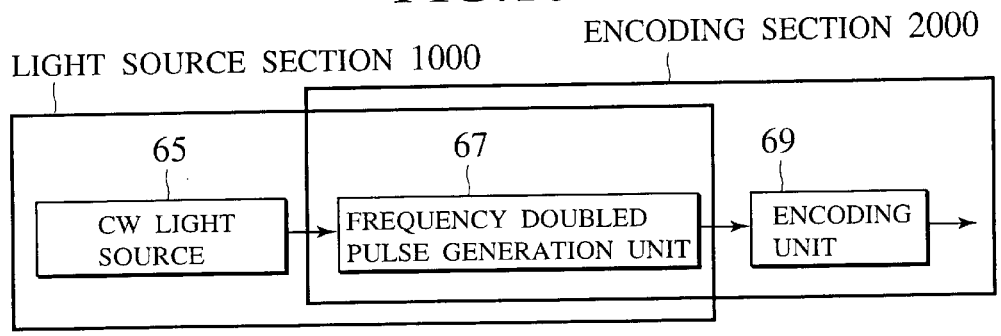
FIG. 18 is a block diagram showing a configuration of an optical transmitter according to the sixth embodiment of the present invention.

FIG. 18 shows a configuration of the optical transmitter according to the sixth embodiment of the present invention. The optical transmitter of FIG. 18 comprises a CW (Continuous-Wave) light source 65, a frequency doubled pulse generation unit 67, and an encoding unit 69. Here, the CW light source 65 and the frequency doubled pulse generation unit 67 constitute the light source section 1000 described above, and the frequency doubled pulse generation unit 67 and the encoding unit 69 constitute the encoding section 2000 described above.

In this embodiment, the continuous-wave lights generated by the CW light source 65 are modulated by the frequency doubled pulse generation unit 67 into clocks with the repetition frequency that is double of a driving frequency supplied to the frequency doubled pulse generation unit 67. This doubled frequency clocks are then encoded by the encoding unit 69. The encoding bit rate used here is equal to the repetition frequency of the optical clocks. In other words, the driving frequency of the clocks supplied to the frequency doubled pulse generation unit 67 is a half of the bit rate.

Here, the CW light source 65 is a laser light source such as DFB-LD, FP-LD or the like. The frequency doubled pulse generation unit 67 is a push-pull type Mach-Zehnder modulator on LN substrate or the like. The encoding unit 69 is a push-pull type Mach-Zehnder modulator on LN substrate or the like.

Next, the operation of the optical transmitter of the sixth embodiment shown in FIG. 18 will be described with reference to FIG. 19. In this embodiment, as shown in FIG. 19, first and second push-pull type Mach-Zehnder modulates 67a and 69a that are formed in series on an LN substrate 66 will be used as the frequency doubled pulse generation unit 67 and the encoding unit 69.

Figure 19:
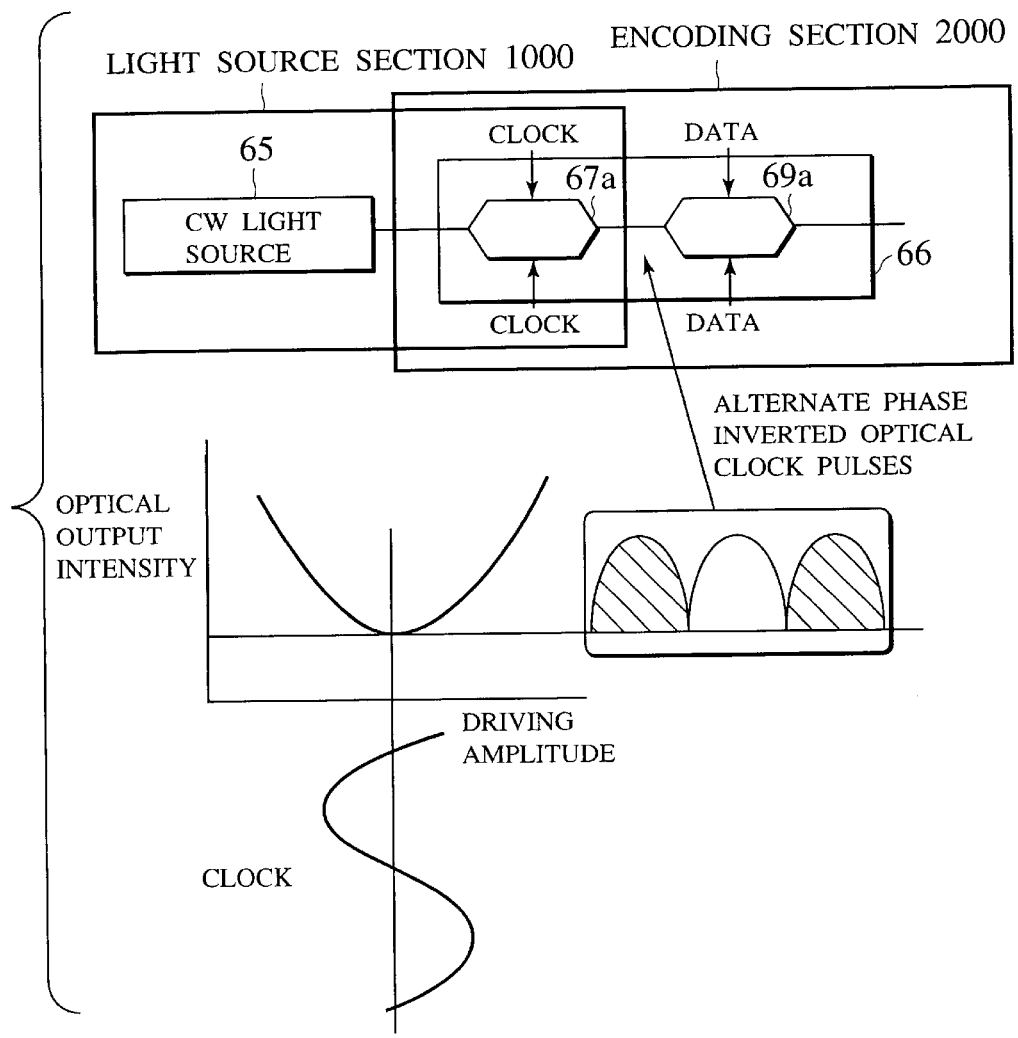
FIG. 19 is a diagram for explaining an operation of the optical transmitter of FIG. 18.

The continuous-wave lights generated by the CW light source 65 are modulated by the first Mach-Zehnder modulator 67a into alternate phase inverted optical clock pulses as shown in FIG. 19. These alternate phase inverted optical clock pulses have the relative optical phase difference between the optical clock pulses in adjacent time-slots equal to an odd integer multiple of π or its vicinity, similarly as in the above described embodiments. At this point, the repetition frequency of electric signals for driving the first Mach-Zehnder modulator 67a can be a half of the frequency of the alternate phase inverted optical clock pulses as indicated in FIG. 19. Here, the alternate phase inversion is realized as the first Mach-Zehnder modulator 67a is driven by a zero-point driving in which the driving point is set to a point at which the transmissivity becomes minimum at a time of no modulation.

The alternate phase inverted optical clock pulses are encoded by the second Mach-Zehnder modulator 69a in a chirp-free manner. FIG. 20 shows exemplary optical waveforms and optical spectra that are obtained by this embodiment for the bit rate of 40 Gbit/s. In the case where the relative optical phase difference is 0 or π, the optical spectrum equivalent to that in the case of optical multiplexing described in the above embodiments is obtained, so that it can be seen that the "out-of-phase" condition for realizing the high dispersion tolerance is also realized in this embodiment.

Here, the optical waveform for the relative optical phase difference equal to π is realized by setting the driving point of the first Mach-Zehnder modulator 67a at a point where the transmissivity becomes minimum at a time of no modulation.

In this configuration of FIG. 19, the duty ratio of the alternate phase inverted optical clock pulses can be controlled from 1/2 to 2/3 by controlling the driving amplitude to be supplied to the first Mach-Zehnder modulator 67a. Also, the waveform of the alternate phase inverted optical clock pulses can be controlled by changing the driving waveform, so that the waveform can be optimized to a waveform having a higher dispersion tolerance. Using these controls, the eye opening degradation due to the interference effect between pulses at a time of zero dispersion can be suppressed to the minimum.

Figure 21:
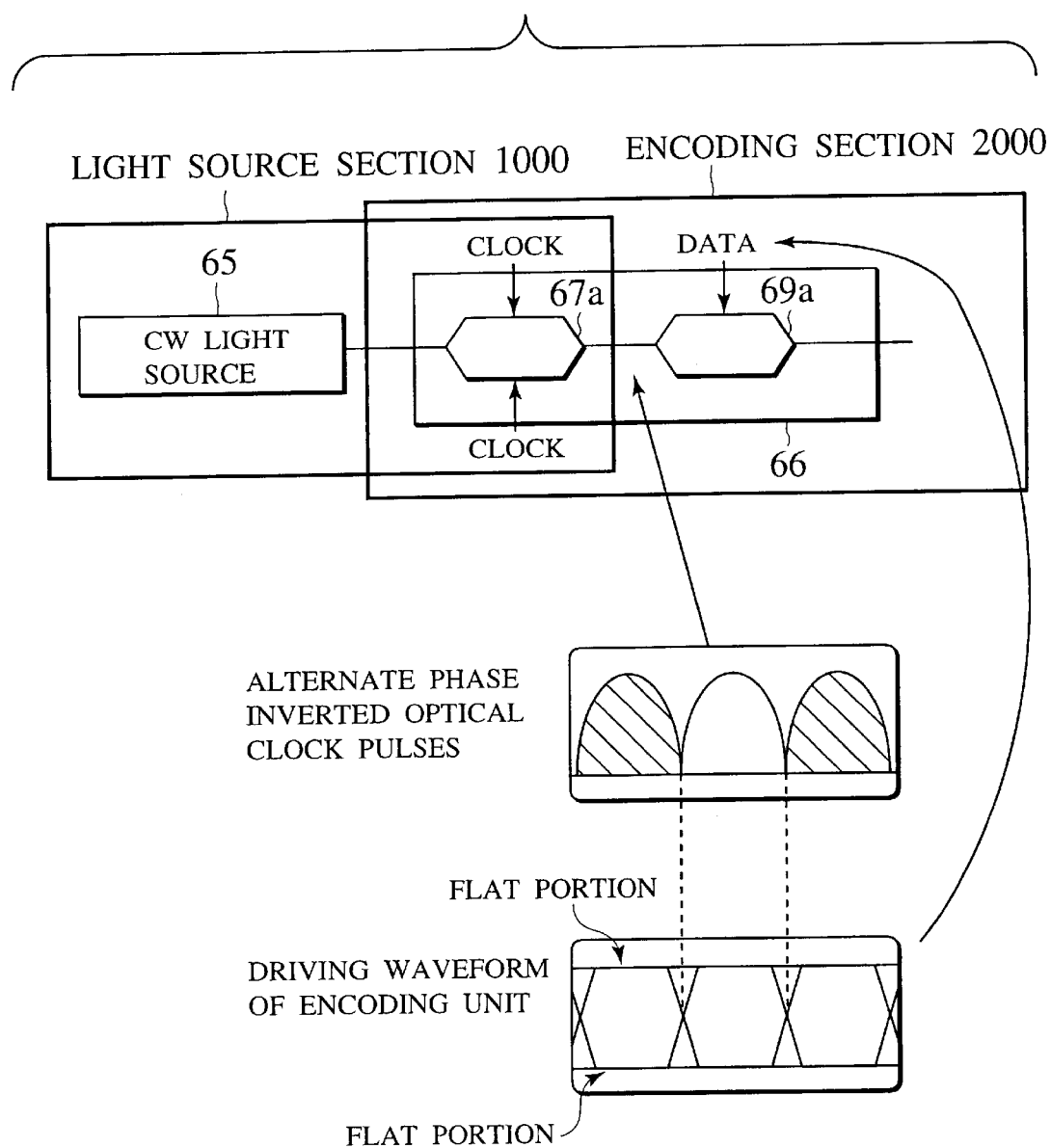
FIG. 21 is a diagram showing the case where a Mach-Zehnder modulator that constitutes an encoding unit in the optical transmitter of FIG. 18 is driven by a single side driving.

Note that the first and second Mach-Zehnder modulators are both driven by the push-pull driving in the configuration of FIG. 19, but the second Mach-Zehnder modulator 69a that constitutes the encoding unit 69 can realize the similar encoding even when it is driven by a single side driving as shown in FIG. 21. In this case, a minute chirp will remain at a time of the encoding, but its influence on the basic operations is small. Moreover, as can be easily seen from the above, it is also possible to use the single side driving for the first Mach-Zehnder modulator 67a that constitutes the frequency doubled pulse generation unit 67. In this case, the driving point is to be set to a point at which the transmissivity becomes minimum at a time of no modulation or its vicinity, similarly as described above. In this case, a minute chirp will remain in the generated frequency doubled pulses, but its influence on the basic operations is small.

In addition, in this embodiment, the case of first generating the alternate phase inverted optical clock pulses and then encoding them has been described, but it is possible to carry out the encoding first and then carry out the alternate phase inversion of the encoded signals. In such a case, the positional relationship of the frequency doubled pulse generation unit 67 and the encoding unit 69 is to be reversed.

Also, in this embodiment, the frequency doubled pulse generation unit and the encoding unit are integrally formed on a single substrate, but they can be formed on separate substrates.

Figure 22:
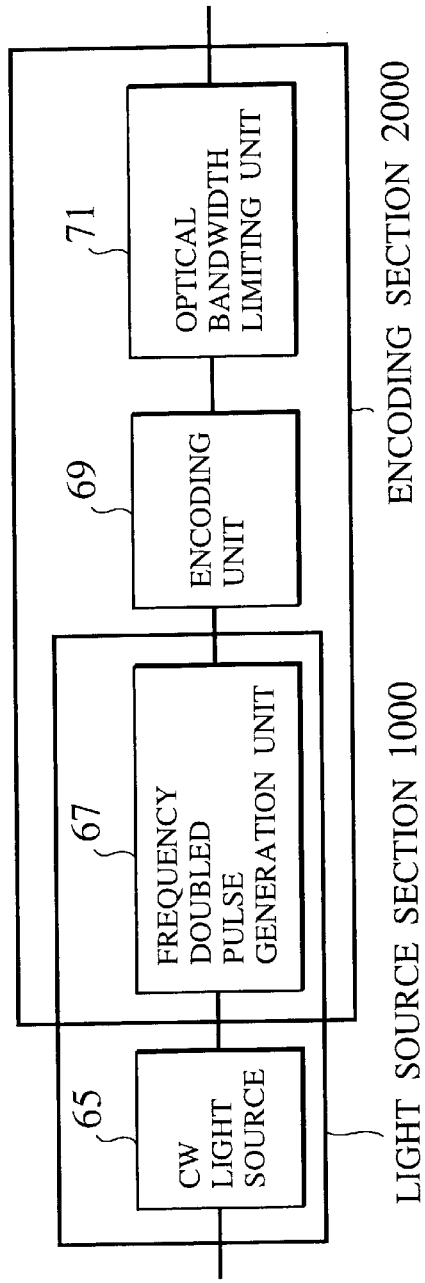
FIG. 22 is a block diagram showing one exemplary configuration where an optical bandwidth limiting unit is provided in the optical transmitter of FIG. 18.
Figure 23:
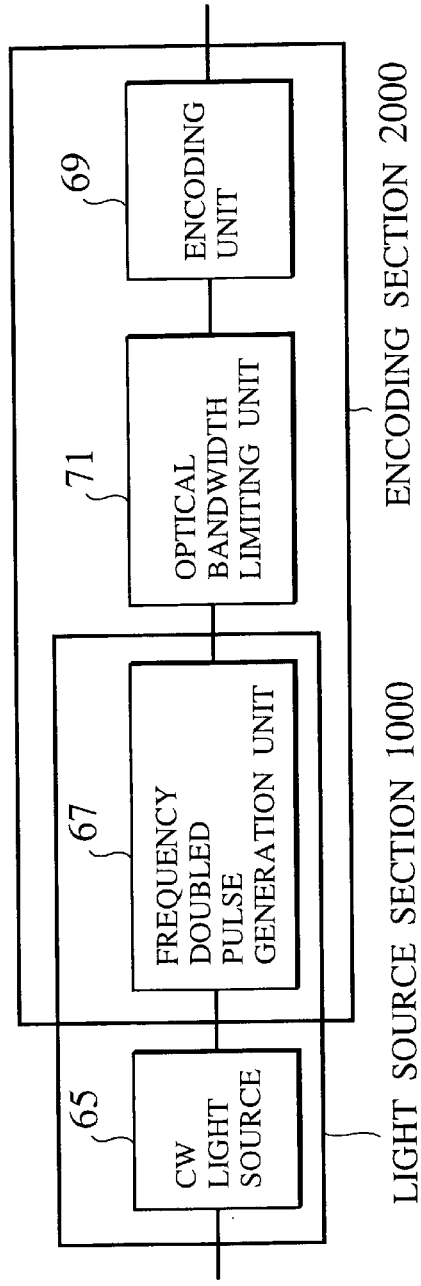
FIG. 23 is a block diagram showing another exemplary configuration where an optical bandwidth limiting unit is provided in the optical transmitter of FIG. 18.

FIG. 22 and FIG. 23 show configurations in which the optical bandwidth limiting unit 71 of FIG. 15 and FIG. 16 is provided in the optical transmitter of the sixth embodiment shown in FIG. 18, where FIG. 22 shows a configuration in which the optical bandwidth limiting unit 71 is provided at an output side of the encoding unit 69 while FIG. 23 shows a configuration in which the optical bandwidth limiting unit 71 is provided at an output side of the frequency doubled pulse generation unit 67. By providing the optical bandwidth limiting unit 71 in such manners, it is possible to remove the unnecessary higher-order harmonic components and thereby it becomes possible to prevent a lowering of the spectral efficiency that could have occurred as the generated optical signals occupy a bandwidth larger than the necessary bandwidth, similarly as in the case of the fifth embodiment described above.

In the embodiments described above, the duty ratio of the optical clock pulses can be set variably so that it is possible to realize both the high dispersion tolerance and the small receiver sensitivity degradation by setting the duty ratio to an appropriate value around 0.5. Also, the relative optical phase difference between the optical clock pulses in adjacent time-slots is set to be an odd integer multiple of π or its vicinity, so that the high dispersion tolerance can be maintained stably.

Figure 24:
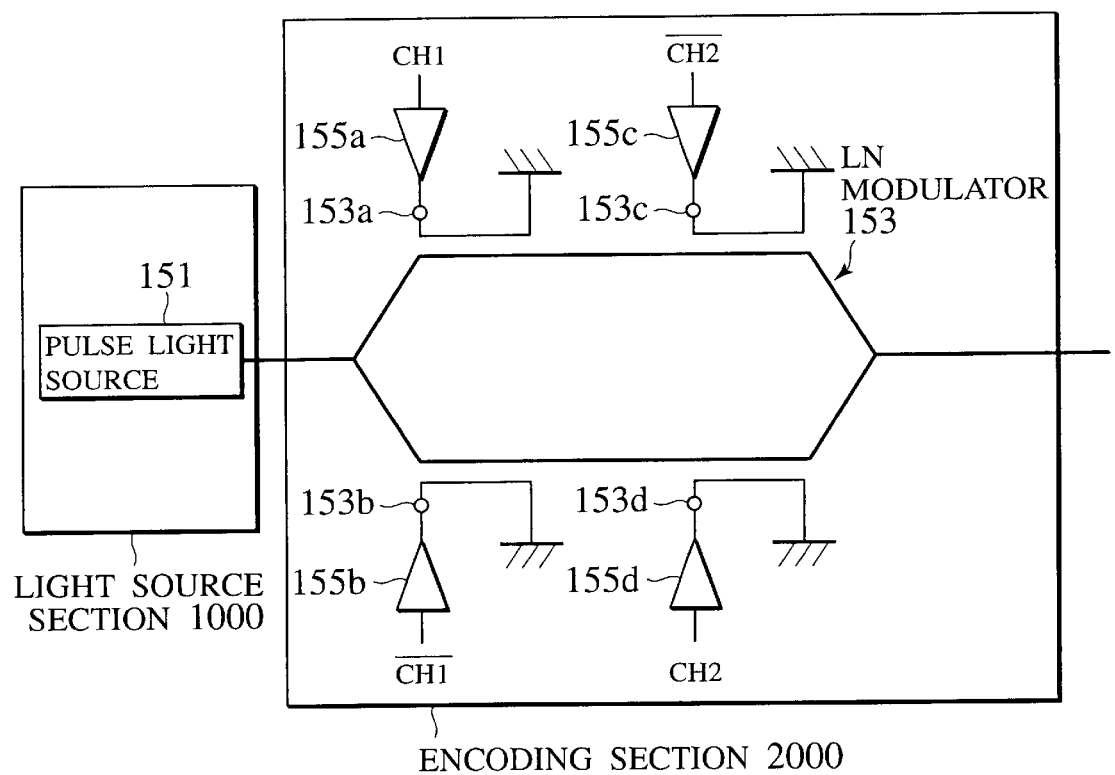
FIG. 24 is a block diagram showing a configuration of an optical transmitter according to the seventh embodiment of the present invention.

FIG. 24 shows a configuration of the optical transmitter according to the seventh embodiment of the present invention. The optical transmitter of FIG. 24 comprises a pulse light source 151 that constitutes the light source section 1000 for generating the optical clock pulses synchronized with the signal bit rate, and an LN modulator 153 and four wideband amplifiers 155a–155d that constitute the encoding section 2000 for encoding the optical clock pulses using the electric signals synchronized with the optical clock pulses. The LN modulator 153 has two pairs of push-pull type modulation electrodes 153a–153d, to which outputs of the wideband amplifiers 155a–155d are respectively connected.

The pulse light source 151 generates optical pulses with the duty ratio of 0.5 or less with respect to a time period of one time-slot in optical signals to be generated. Also, the electric signals to be entered into this optical transmitter are RZ codes with the duty ratio of 0.5 or its vicinity in optical signals to be generated. The input RZ codes are entered into the wideband amplifiers 155a–155d as CH1, CH2 and their inversion $\overline{\text{CH1}}$, $\overline{\text{CH2}}$ as indicated in FIG. 24, and amplified by the wideband amplifiers 155a–155d to a voltage sufficient for driving the LN modulator 153, that is, in a vicinity of Vπ/2. Then, the optical pulses from the pulse light source 151 are encoded into alternate phase inverted RZ codes by using the electric signals amplified by the wideband amplifiers 155a–155d.

Here, the pulse light source 151 is an optical pulse generator such as semiconductor mode-locked laser, ring laser, modulator-integrated light source or the like, or a combination of a CW light source and an external modulator such as LN modulator (which will be also collectively referred to as a mode-locked laser type light source hereinbelow). Also, the LN modulator 153 having two pairs of the push-pull type modulation electrodes 153a–153d is a Mach-Zehnder interferometer type optical intensity modulator, where each of the upper side and lower side arms of this Mach-Zehnder interferometer type optical intensity modulator has two modulation electrodes provided in series, and controls the optical phase independently. The wideband amplifiers 155a–155d amplify the amplitude of the electric signals to be entered into the LN modulator 153 up to a value required for driving the LN modulator 153.

In this optical transmitter of FIG. 24, the optical pulses with the duty ratio less than or equal to 0.5 outputted from the pulse light source 151 are entered into the LN modulator 153 having two pairs of the push-pull type modulation electrodes 153a–153d, split by this LN modulator 153 at a split ratio of 1:1, and the phase shift is independently applied at the upper side arm and the lower side arm of the LN modulator 153. Here, as shown in FIG. 24, in this LN modulator 153, signals entered into the modulation electrodes provided at corresponding positions on the lower side arm and the upper side arm of the LN modulator 153 are set to be mutually inverted signals such that the LN modulator is driven by the push-pull driving.

Figure 25:
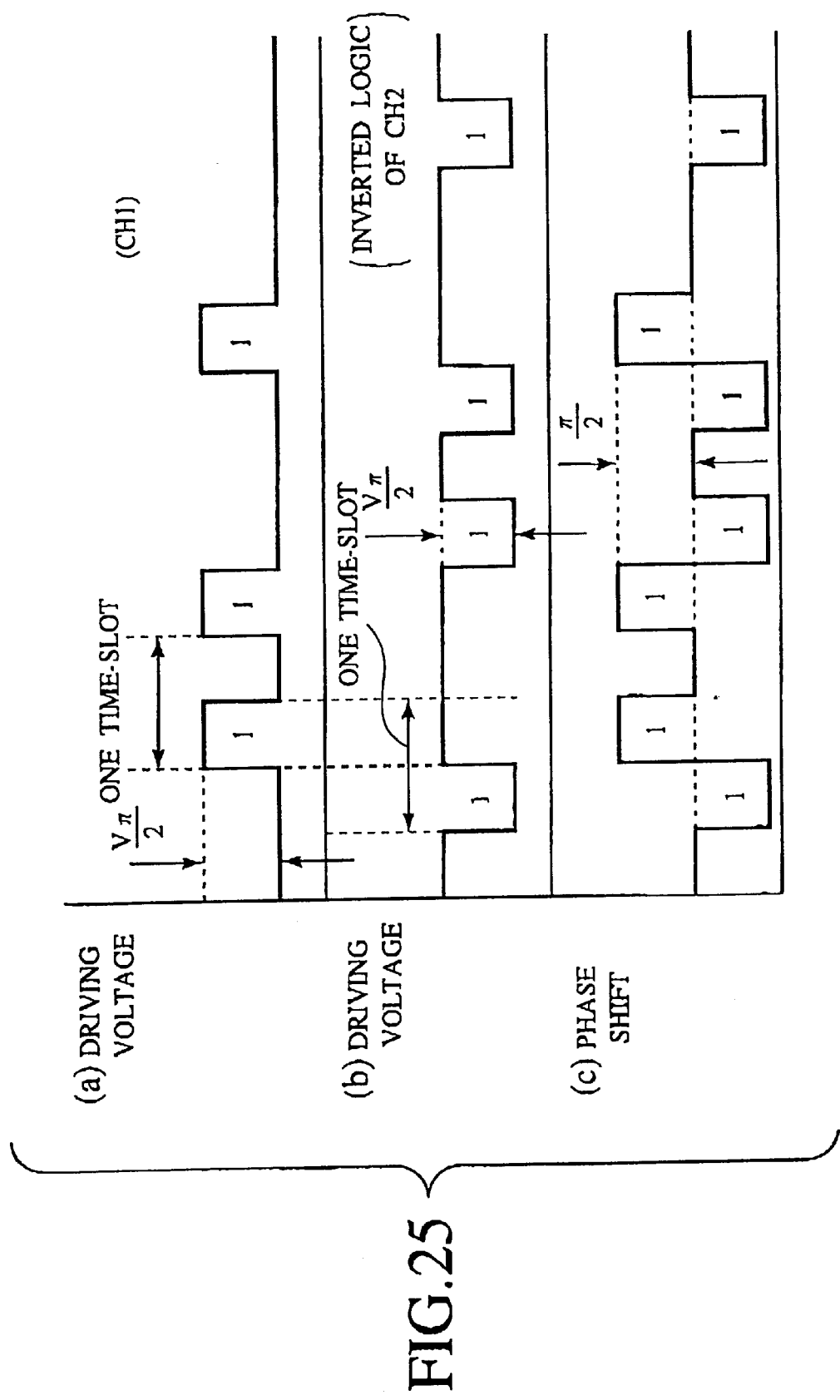
FIG. 25 is a diagram for explaining an operation of the optical transmitter of FIG. 24, regarding a phase shift on an upper side arm of a Mach-Zehnder interferometer type optical intensity modulator.

The electric signals CH1 and $\overline{CH2}$ to be applied to the upper side arm of the LN modulator 153 have the driving amplitudes as shown in parts (a) and (b) of FIG. 25 respectively. As shown in parts (a) and (b) of FIG. 25, these electric signals CH1 and $\overline{CH2}$ have the duty ratio of 0.5 or its vicinity, and the amplitude is set to be Vπ/2 by the wideband amplifiers 155a and 155c. In addition, the the relative phases in time of these two electric signals are set to be displayed by 1/2 time-slot as indicated in FIG. 25. By setting in this way, the phase shift as indicated in a part (c) of FIG. 25 will be applied as the total phase shift on the upper side arm of the Mach-Zehnder interferometer type optical intensity modulator. Namely, the phase shift of π at maximum will be applied.

Figure 26:
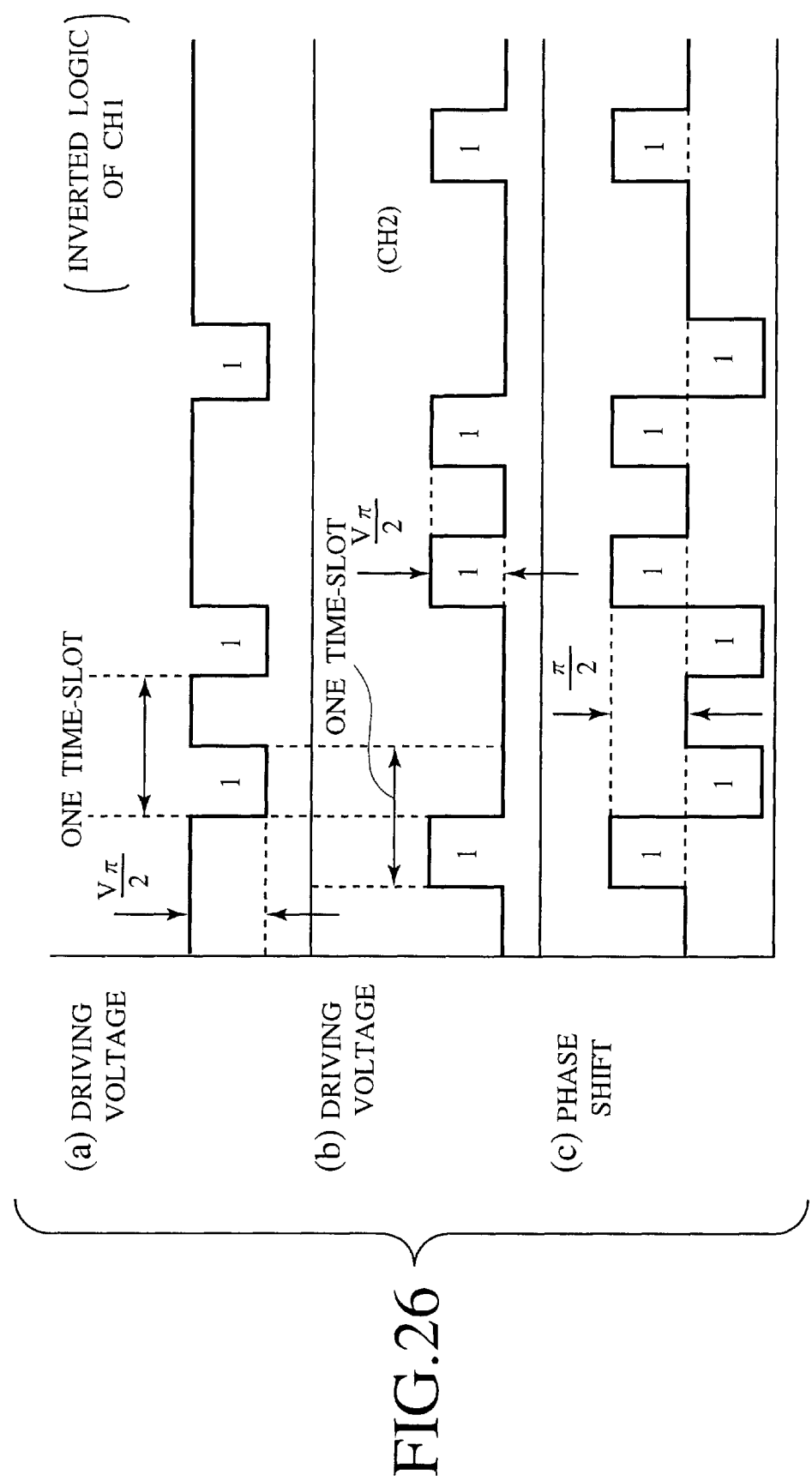
FIG. 26 is a diagram for explaining an operation of the optical transmitter of FIG. 24, regarding a phase shift on a lower side arm of a Mach-Zehnder interferometer type optical intensity modulator.

On the other hand, the electric signals $\overline{CH1}$ and CH2 to be applied to the lower side arm of the LN modulator 153 are the logical inversion of the electric signals CH1 and $\overline{CH2}$ to be applied to the upper side arm, as shown in parts (a) and (b) of FIG. 26 respectively. Namely, to the lower side arm of the Mach-Zehnder interferometer type optical intensity modulator, the driving amplitude that is the logical inversion of CH1 is applied at the first modulation electrode and the driving amplitude of CH2 is applied at the next modulation electrode. Consequently, the phase shift applied on the lower side arm is an inversion of that applied on the upper side arm, as shown in a part (c) of FIG. 26.

Figure 27:
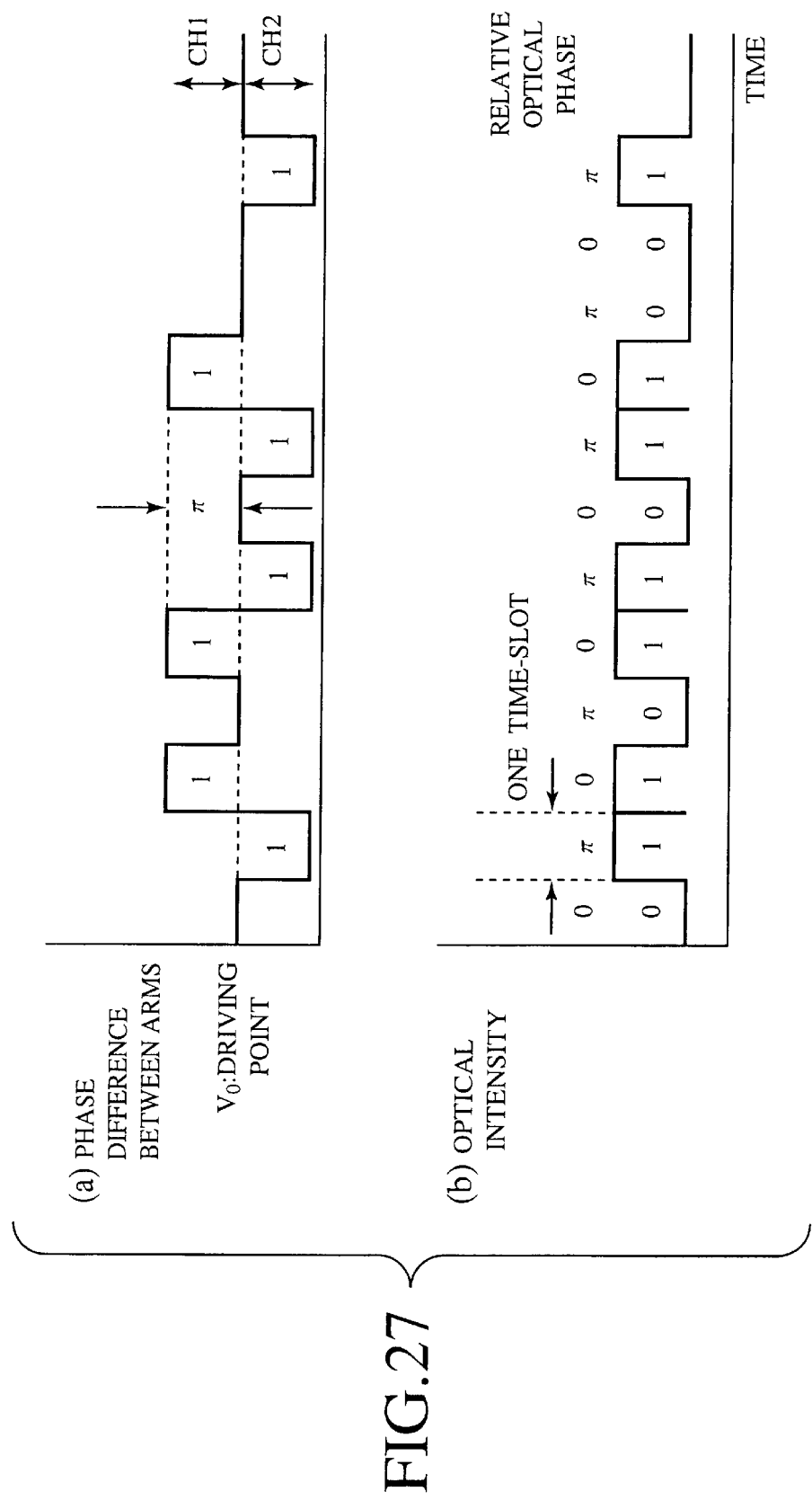
FIG. 27 is diagrams for explaining an operation of the optical transmitter of FIG. 24, regarding a total phase shift and an optical intensity.
Figure 28:
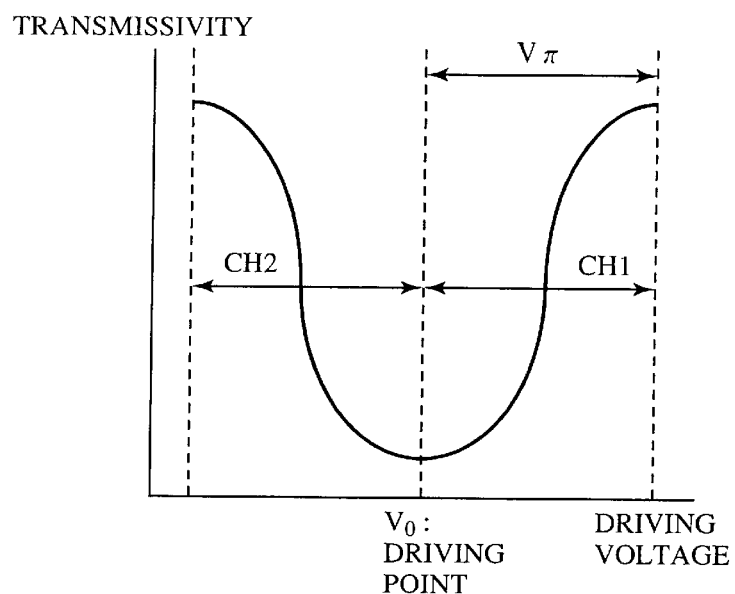
FIG. 28 is a diagram for explaining an operation of the optical transmitter of FIG. 24, regarding a driving point.

By summing the phase shifts applied on the upper side arm and the lower side arm, the relative optical phase difference has an overall amplitude of 2π as indicated in a part (a) of FIG. 27 eventually. The bias voltage is adjusted such that the driving point indicated in a part (a) of FIG. 27 is set to coincide with the extinction voltage of the Mach-Zehnder interferometer type optical intensity modulator. Namely, as shown in FIG. 28, a zero-point driving in which a direction of the driving amplitude is reversed in the electric signals CH1 and CH2 will be carried out. In this way, the Mach-Zehnder interferometer type optical intensity modulator reverses the phase at its extinction point, so that the generated optical signals become alternate phase inverted optical clock pulses as shown in a part (b) of FIG. 27.

The optical transmitter of this embodiment has a multiplexing function that can multiplex two electric signals by applying the electric signals CH1 and CH2 through the wideband amplifiers 155a–155d from the two pairs of the push-pull type modulation electrodes 153a–153d of the LN modulator 153, while this optical transmitter is operated by signals having a bit rate which is less than or equal to a half of that of the optical signals to be generated, so that one multiplexing circuit can be omitted and inexpensive amplifiers can be used for driving the modulator.

Note that it is also possible to construct the optical transmitter of this embodiment by using the LN modulator having only one pair of the push-pull type modulation electrodes when the multiplexing function is unnecessary.

Figure 29:
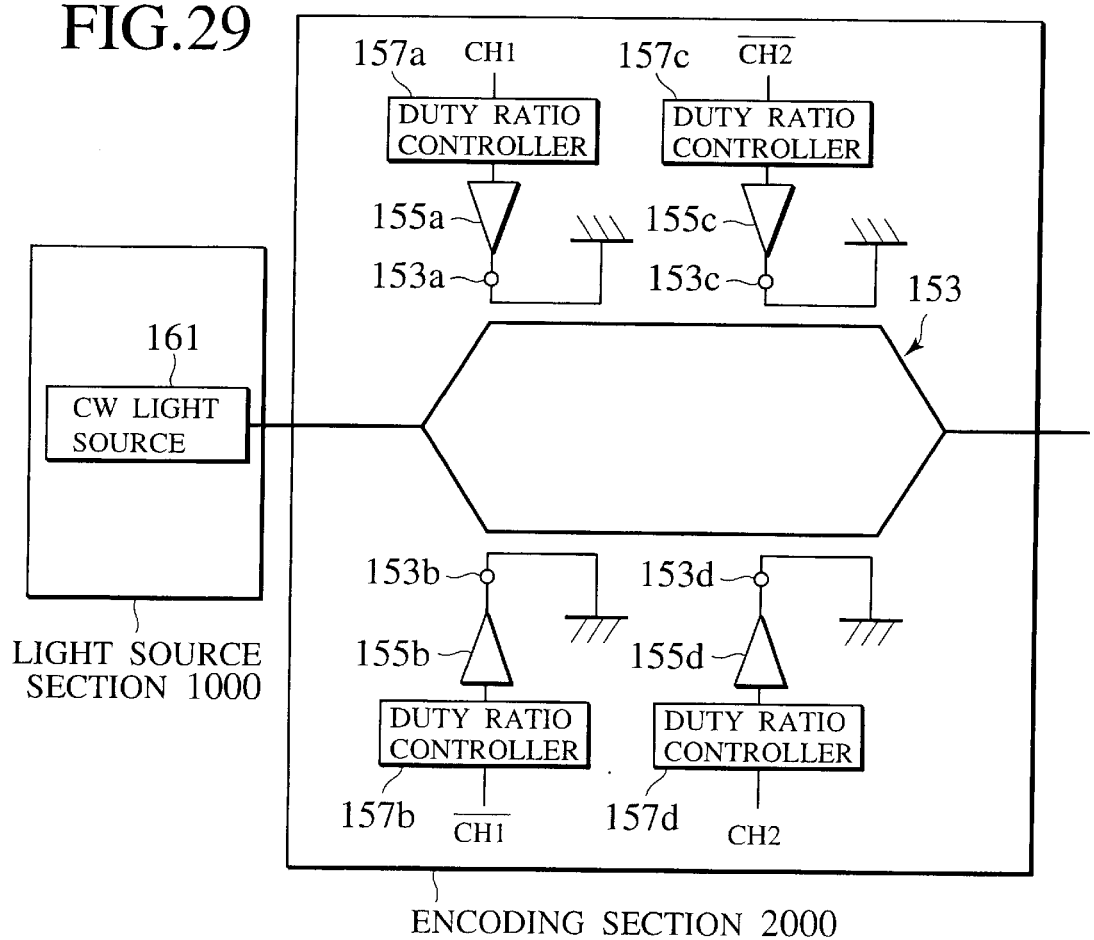
FIG. 29 is a block diagram showing a configuration of an optical transmitter according to the eighth embodiment of the present invention.

FIG. 29 shows a configuration of the optical transmitter according to the eighth embodiment of the present invention. The optical transmitter of FIG. 29 differs from the optical transmitter of FIG. 24 in that a CW light source 161 for generating stable continuous-wave lights is used instead of the pulse light source 151, and duty ratio controllers 157a–157d that are capable of electrically controlling the duty ratio are provided at the input side of the wideband amplifiers 155a–155d respectively. The rest of the configuration and the operations are the same as the seventh embodiment of FIG. 24 so that the corresponding constituent elements are given the same reference numerals in FIG. 24 and FIG. 29. In this case, the light source section 1000 is formed by the CW light source 161 and the duty ratio controllers 157a–157d.

The CW light source 161 is a light source such as DFB laser or variable wavelength laser.

Figure 30:
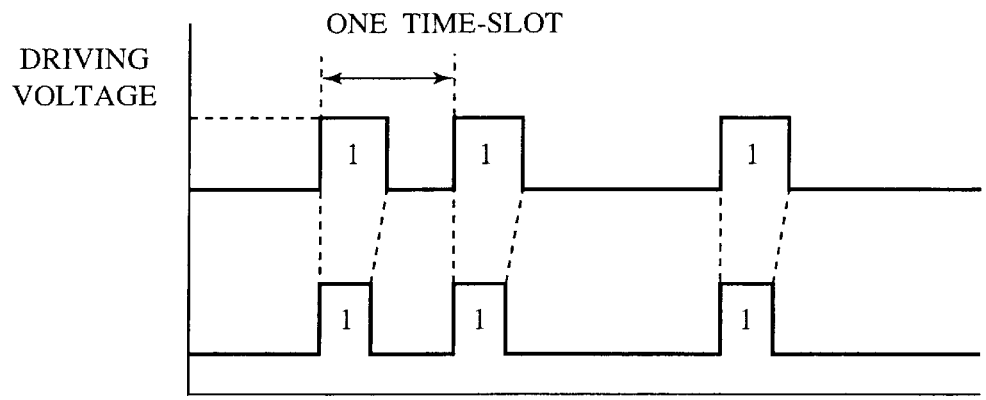
FIG. 30 is a diagram for explaining an operation of a duty ratio controller provided in the optical transmitter of FIG. 29.
Figure 31:
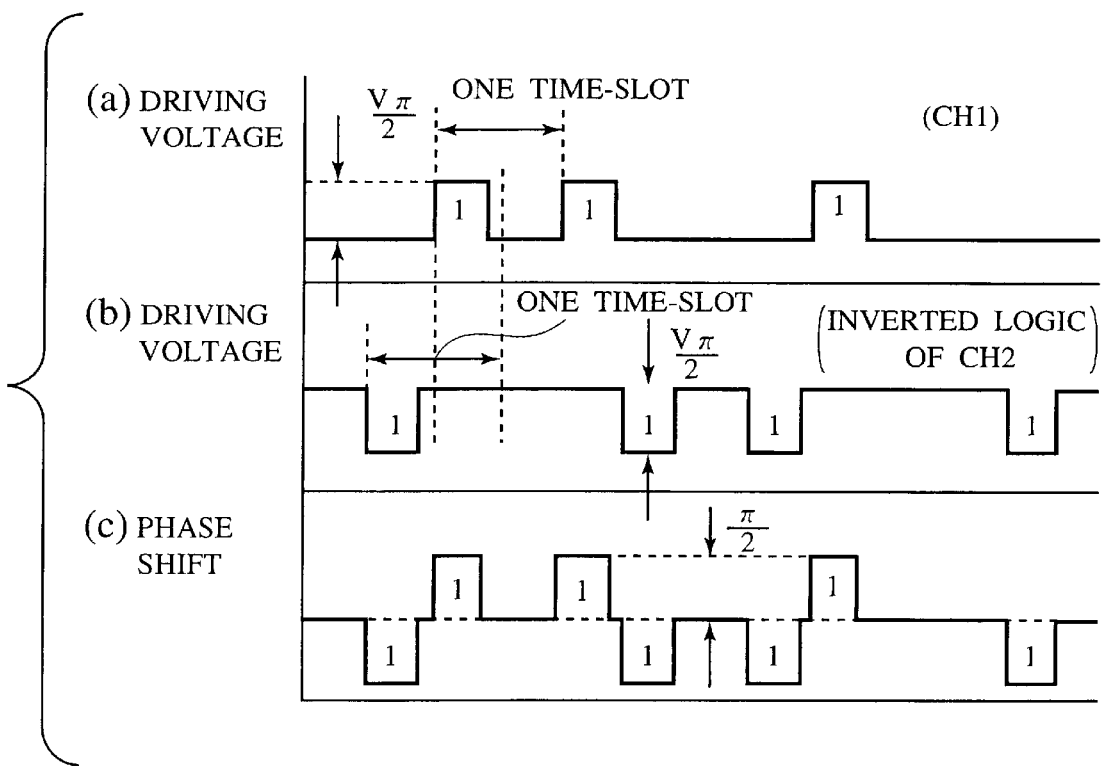
FIG. 31 is a diagram for explaining an operation of the optical transmitter of FIG. 29, regarding a phase shift on an upper side arm of a Mach-Zehnder interferometer type optical intensity modulator.
Figure 32:
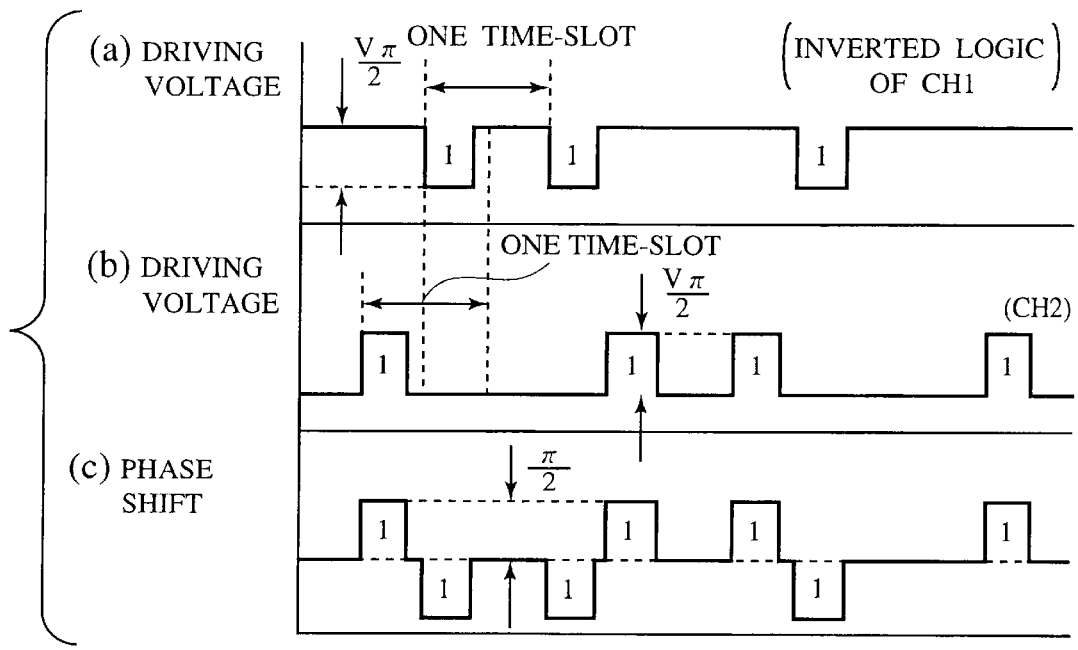
FIG. 32 is a diagram for explaining an operation of the optical transmitter of FIG. 29, regarding a phase shift on a lower side arm of a Mach-Zehnder interferometer type optical intensity modulator.
Figure 33:
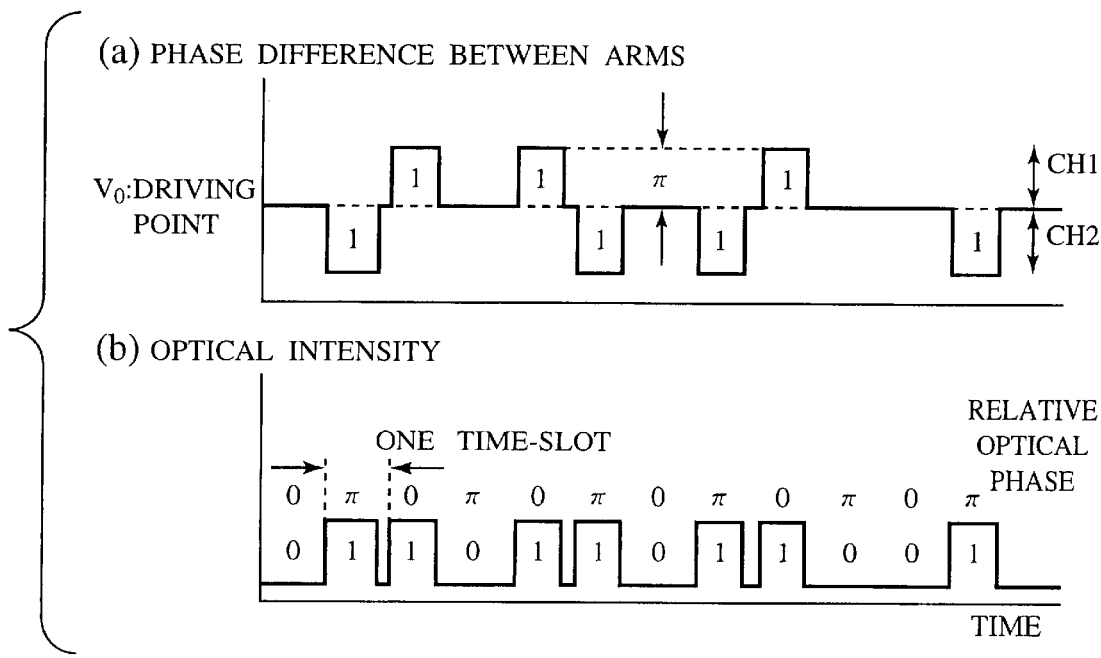
FIG. 33 is diagrams for explaining an operation of the optical transmitter of FIG. 29, regarding a total phase shift and an optical intensity.

The duty ratio controllers 157a–157d are provided in order to control the duty ratio of the generated optical pulses, and are capable of electrically controlling the duty ratio as shown in FIG. 30. Using these duty ratio controllers 157a–157d, it becomes possible to generate the optical pulses at the stable duty ratio while suppressing interferences among the optical pulses, without using the variable duty ratio pulse light source. Such a duty ratio controller can be realized by a combination of digital ICs or the like. When the duty ratio is controlled in order to suppress interferences among the optical pulses, FIG. 25, FIG. 26 and FIG. 27 described above will be modified as shown in° FIG. 31, FIG. 32 and FIG. 33, respectively, which are basically similar to FIG. 25, FIG. 26 and FIG. 27 except that the duty ratio is changed.

It is also possible to provide waveform shaping units such as electric low pass filters at the output side of the duty ratio controllers 157a–157d, for the purpose of smoothing the driving waveform and preventing the higher-order harmonic generation.

In this optical transmitter of FIG. 29, the continuous-wave lights from the CW light source 161 are modulated by the LN modulator 153 by using the electric signals CH1 and CH2 of the RZ codes that are amplified by the wideband amplifiers 155a–155d, to produce the encoded and multiplexed output in forms of the alternate phase inverted RZ codes, similarly as in the case of FIG. 24.

Figure 34:
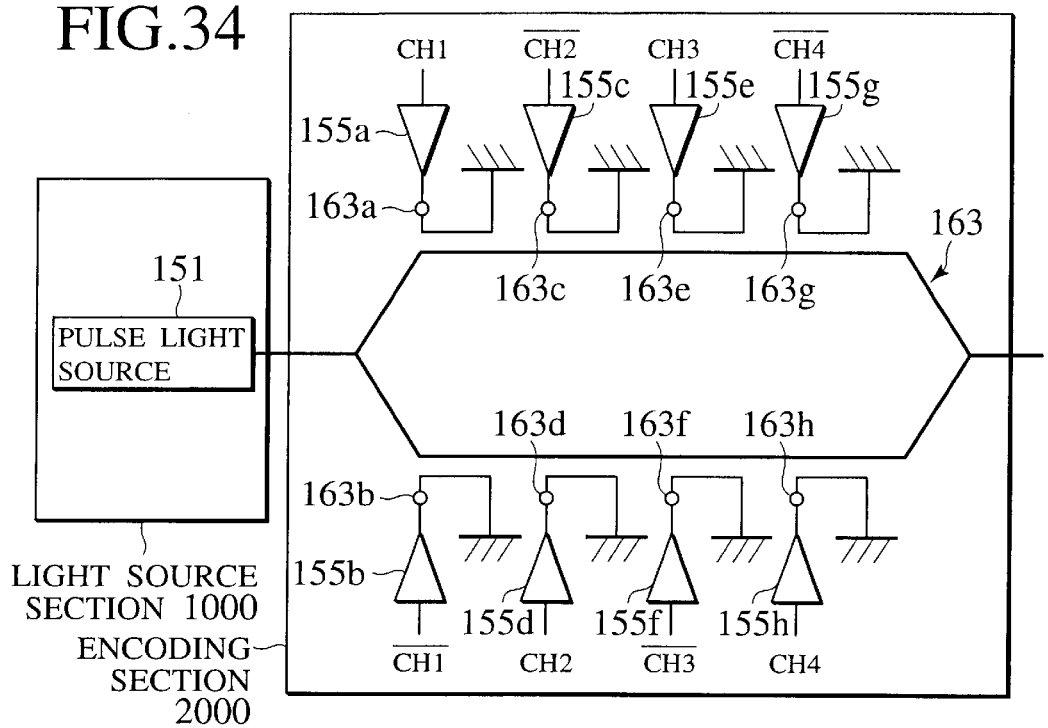
FIG. 34 is a block diagram showing a configuration of an optical transmitter according to the ninth embodiment of the present invention.

FIG. 34 shows a configuration of the optical transmitter according to the ninth embodiment of the present invention. The optical transmitter of FIG. 34 differs from the optical transmitter of FIG. 24 in that an LN modulator 163 having four pairs of push-pull type modulation electrodes 162a–163h is used instead of the LN modulator 153 having two pairs of push-pull type modulation electrodes 153a–153d, and eight wideband amplifiers 155a–155h are used in correspondence to the four pairs of the push-pull type modulation electrodes 163a–163h instead of four wideband amplifiers 155a–155d. The rest of the configuration and the operations are the same as the seventh embodiment of FIG. 24 so that the corresponding constituent elements are given the same reference numerals in FIG. 24 and FIG. 30.

In this optical transmitter of FIG. 34, the basic operations are the same as the optical transmitter of FIG. 24, but the electric signals to be applied to the upper side and lower side arms of the LN modulator 163 having four pairs of the push-pull type modulation electrodes 163a–163h are set such that mutually inverted signals are entered into the corresponding modulation electrodes. Then, the optical pulses from the pulse light source 151 are modulated by the LN modulator 163 by using the electric signals CH1, CH2, CH3 and CH4 of the RZ codes that are amplified by the wideband amplifiers 155a–155h, to produce the encoded and multiplexed output in forms of the alternate phase inverted RZ codes.

Figure 35:
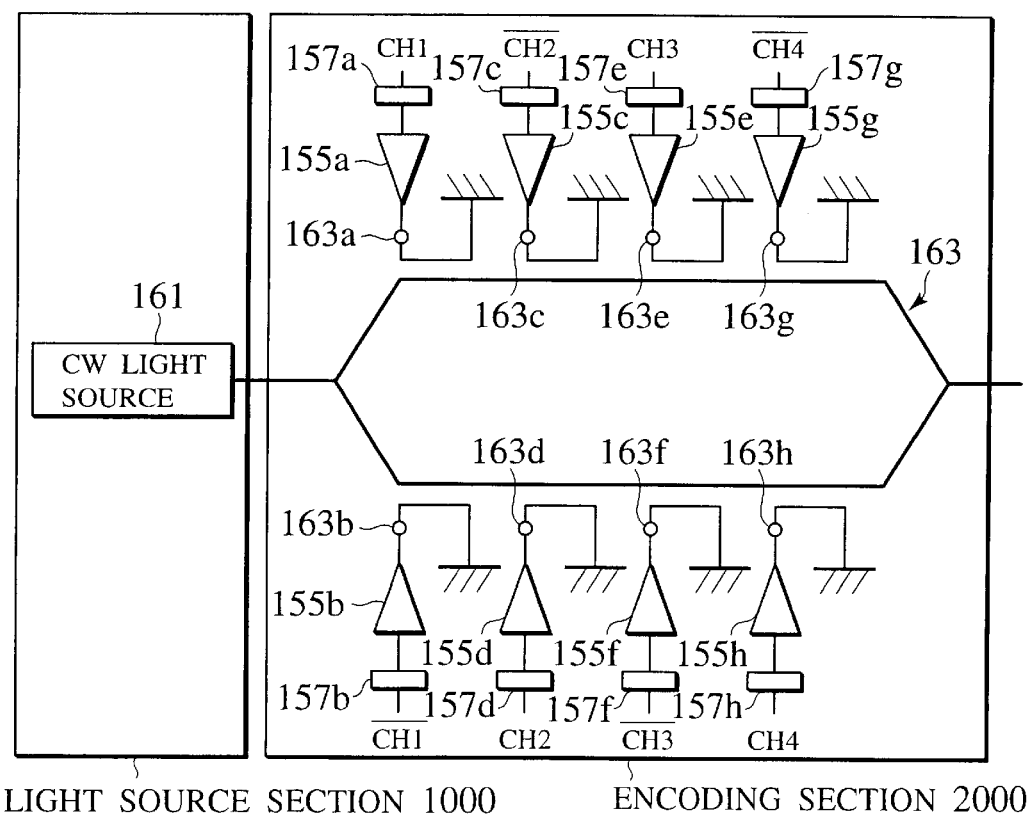
FIG. 35 is a block diagram showing a configuration of an optical transmitter according to the tenth embodiment of the present invention.

FIG. 35 shows a configuration of the optical transmitter according to the tenth embodiment of the present invention. The optical transmitter of FIG. 35 differs from the optical transmitter of FIG. 30 in that a CW light source 161 for generating stable continuous-wave lights is used instead of the pulse light source 151, and duty ratio controllers 157a–157h that are capable of electrically controlling the duty ratio are provided at the input side of the wideband amplifiers 155a–155h respectively. The rest of the configuration and the operations are the same as the seventh embodiment of FIG. 34 so that the corresponding constituent elements are given the same reference numerals in FIG. 34 and FIG. 35.

In this optical transmitter of FIG. 35, the continuous-wave lights from the CW light source 161 are modulated by the LN modulator 163 by using the electric signals CH1, CH2, CH3 and CH4 of the RZ codes that are amplified by the wideband amplifiers 155a–155h, to produce the encoded and multiplexed output in forms of the alternate phase inverted RZ codes, similarly as in the case of FIG. 34.

Figure 36:
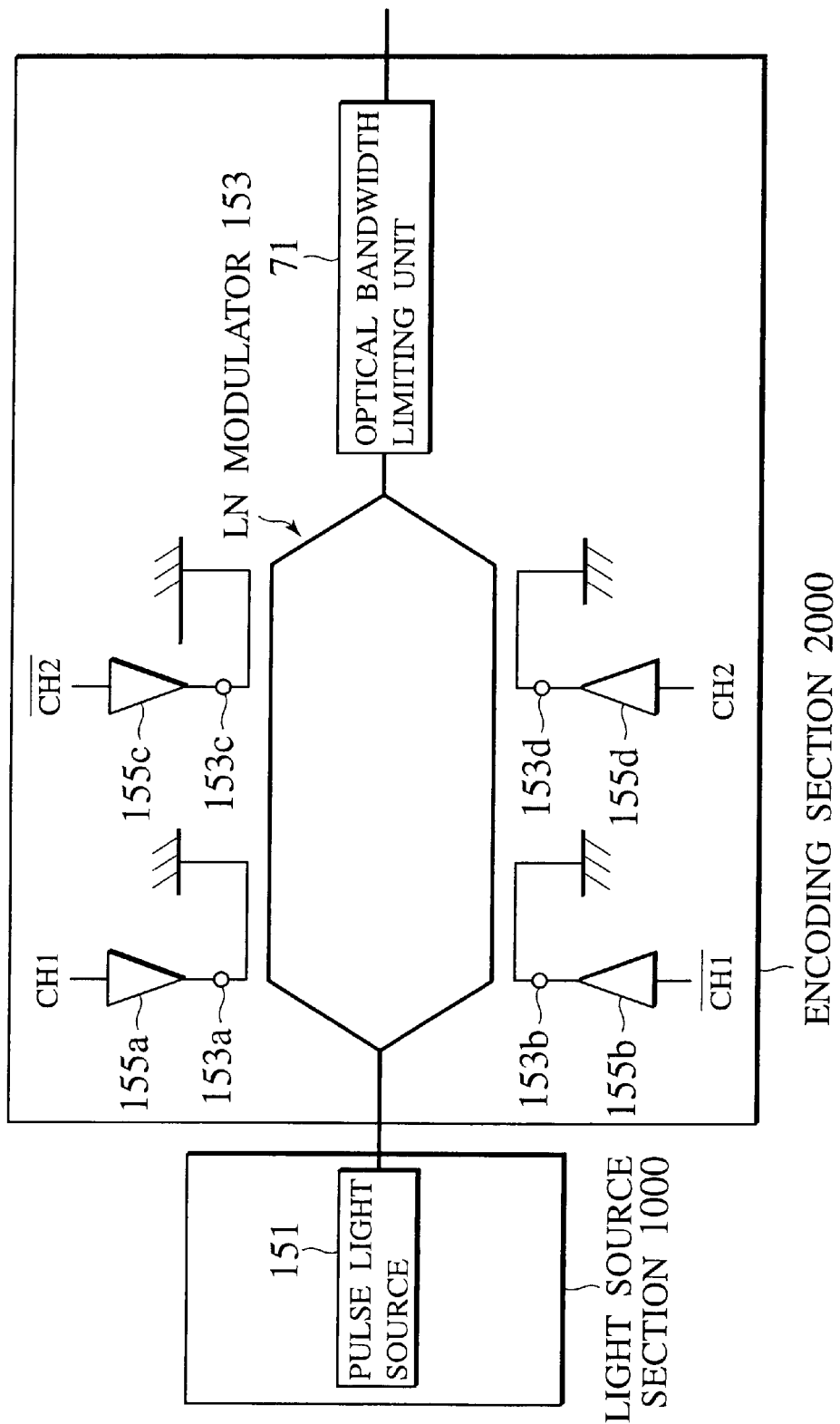
FIG. 36 is a block diagram showing a configuration where an optical bandwidth limiting unit is provided in the optical transmitter of FIG. 24.

FIG. 36 shows a configuration in which the optical bandwidth limiting unit 71 of FIG. 15 and FIG. 16 is provided in the optical transmitter of the seventh embodiment shown in FIG. 24, where the optical bandwidth limiting unit 71 is provided at an output side of the LN modulator 153. By providing the optical bandwidth limiting unit 71 in such a manner, it is possible to remove the unnecessary higher-order harmonic components and thereby it becomes possible to prevent a lowering of the spectral efficiency that could have occurred as the generated optical signals occupy a bandwidth larger than the necessary bandwidth, similarly as in the case of the fifth embodiment described above.

In the seventh to tenth embodiments described above, the optical pulses outputted from the LN modulator 153 or 163 have the relative optical phase difference between the optical clock pulses in adjacent time-slots which is always equal to $\pi$, so that the high dispersion tolerance is realized.

Note that the ninth and tenth embodiments describe the case where the number of multiplexing is 4, but these embodiments can be easily extended to the case using any even number of channels.

Figure 37:
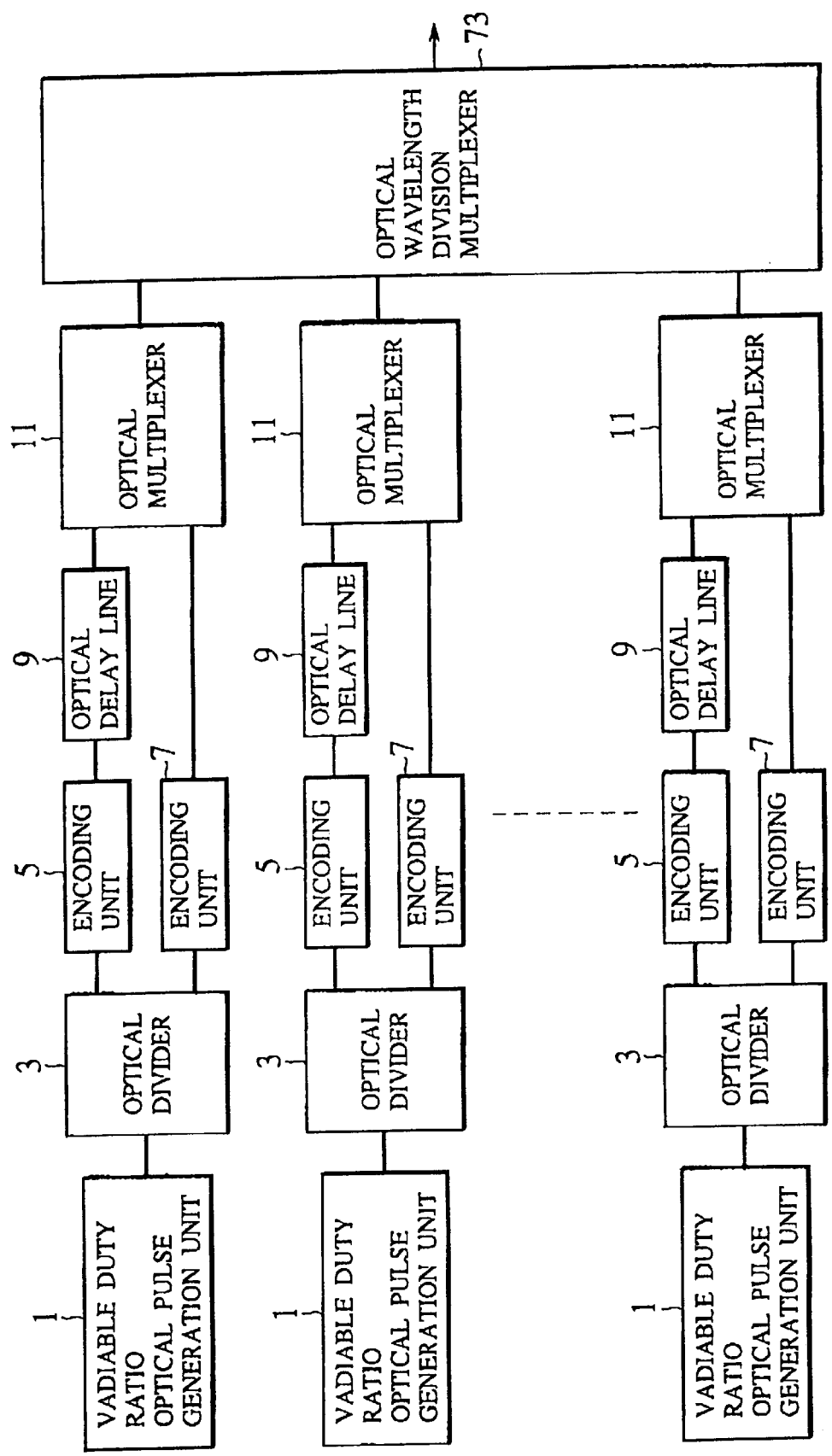
FIG. 37 is a block diagram showing a configuration of an optical transmission apparatus according to the eleventh embodiment of the present invention.

FIG. 37 shows a configuration of an optical transmission apparatus according to the eleventh embodiment of the present invention. The optical transmission apparatus of FIG. 37 is formed by providing a plurality of optical transmitters as shown in FIG. 6 in parallel, setting these plurality of optical transmitters to output optical signals of mutually different optical wavelengths, and providing an optical wavelength division multiplexer 73 for multiplexing the optical signals outputted from these plurality of optical transmitters and outputting the wavelength division multiplexed output.

Here, the optical wavelength division multiplexer 73 has a periodic transmission bandwidth with a characteristic for blocking components outside the necessary optical signal bandwidth, such that the unnecessary higher-order harmonic components are removed.

Next, with reference to FIG. 38, the operation of this optical transmission apparatus of FIG. 37 will be described in further detail. A part (a) of FIG. 38 shows a diagram representing an exemplary optical spectrum of the optical signals in different wavelengths that are outputted from the plurality of optical transmitters that are provided in parallel in the optical transmission apparatus of FIG. 37. As shown in a part (a) of FIG. 38, the unnecessary higher-order harmonic components appear on both outer sides of the necessary signal bandwidth indicated as the optical signal bit rate before wavelength division multiplexing, at the variable duty ratio optical pulse generation unit 1 or the encoding unit 5 that constitutes each optical transmitter.

The optical wavelength division multiplexer 73 has a periodic transmission bandwidth with a characteristic for blocking these unnecessary higher-order harmonic components, that is, components outside the necessary optical signal bandwidth, as shown in a part (b) of FIG. 38. Consequently, by providing the optical wavelength division multiplexer 73 having such a periodic transmission bandwidth characteristic, it becomes possible to suppress the unnecessary higher-order harmonic components that are appearing on both outer sides as shown in a part (c) of FIG. 38. In this way, it is possible to prevent a lowering of the spectral efficiency that could have occurred as the generated optical signals occupy a bandwidth larger than the necessary bandwidth, and it is possible to prevent a degradation of the transmission characteristic due to cross-talk among the optical signals of different wavelengths.

Note that FIG. 37 shows the case of providing a plurality of optical transmitters of FIG. 6 in parallel, but it is also possible to provide a plurality of optical transmitters of FIG. 18 or FIG. 24 in parallel instead.

As described above, according to the present invention, the duty ratio of the optical clock pulses can be set variably so that it is possible to realize both the high dispersion tolerance and the small receiver sensitivity degradation by setting the duty ratio to an appropriate value. Also, the relative optical phase difference between the optical clock pulses in adjacent time-slots is set to be an odd integer multiple of $\pi$ or its vicinity, so that the high dispersion tolerance can be maintained stably. Consequently, it is possible to provide a stable optical transmitter which is suitable for construction of larger scale networks.

Also, according to the present invention, the optical transmitter can be provided with a signal multiplexing function and operated by signals having a bit rate which is less than or equal to a half of that of the optical signals to be generated, so that one multiplexing circuit can be omitted and inexpensive amplifiers can be used for driving the modulator, and therefore a significant economical advantage can be provided.

In addition, according to the present invention, the unnecessary higher-order harmonic components contained in the optical signals generated by the optical transmitter can be removed by the optical bandwidth limiting unit, so that it is possible to prevent a lowering of the spectral efficiency that could have occurred as the generated optical signals occupy a bandwidth larger than the necessary bandwidth, and therefore the spectral efficiency can be improved.

Moreover, according to the present invention, the unnecessary higher-order harmonic components can be removed by the optical wavelength division multiplexer having a periodic transmission bandwidth with a characteristic for blocking components outside the necessary optical signal bandwidth, so that it is possible to prevent a lowering of the spectral efficiency that could have occurred as the generated optical signals occupy a bandwidth larger than the necessary bandwidth, and it is possible to prevent a degradation of the transmission characteristic due to cross-talk among the optical signals of different wavelengths.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical transmitter, comprising:
   variably setting a duty ratio of optical clock pulses to a value that makes interferences between pulses small a light source section configured to generate optical clock pulses synchronized with a signal bit rate while maintaining a duty ratio of the optical clock pulses constant; and
   an encoding section configured to encode the optical clock pulses by using electric signals synchronized with the optical clock pulses while setting a relative optical phase difference between the optical clock pulses in adjacent time-slots to be an odd integer multiple of $\pi$.

2. The optical transmitter of claim 1, wherein the light source section has a mode-locked laser type light source for generating the optical clock pulses synchronized with the signal bit rate while maintaining the duty ratio constant, which is capable of variably setting the duty ratio of the optical clock pulses.

3. The optical transmitter of claim 1, wherein the encoding section has a divider for dividing the optical clock pulses, an encoding and delaying unit for encoding each output signal of the divider by using the electric signals synchronized with the optical clock pulses while delaying those output signals of the divider other than one output signal of the divider with respect to the one output signal of the divider, and a multiplexer for multiplexing output signals of the encoding and delaying unit, wherein delays applied by the encoding and delaying unit to those output signals of the divider other than the one output signal of the divider are given by $[(k/n)+m]$ ($k=1, 2, \ldots, (n-1)$, respectively) times a time period of one time-slot for encoding, where n is a number of multiplexing by the multiplexer and m is an arbitrary integer, such that the relative optical phase difference becomes the odd integer multiple of $\pi$.

4. The optical transmitter of claim 3, wherein the encoding and delaying unit comprises encoding units for encoding each output signal of the divider by using the electric signals synchronized with the optical clock pulses, and delay units for delaying at least a part of output signals of the encoding units.

5. The optical transmitter of claim 3, wherein the encoding and delaying unit comprises delay units for delaying at least a part of output signals of the divider, and encoding units for encoding output signals of the delay units and any output signal of the divider that is not delayed by the delay units by using the electric signals synchronized with the optical clock pulses.

6. The optical transmitter of claim 3, further comprising:
   an optical spectrum extraction unit configured to split a part of signals multiplexed by the multiplexer and to extract a central component or line spectra adjacent to the central component of an optical spectrum of the part of signals; and
   a feedback unit configured to generate feedback signals based on the central component or the line spectra extracted by the optical spectrum extraction unit.

7. The optical transmitter of claim 6, wherein the encoding and delaying unit has a variable delay unit which is capable of varying an amount of delay, and
   the feedback unit has a delay control unit for generating the feedback signals to control the variable delay unit such that the central component or the line spectra extracted by the optical spectrum extraction unit becomes maximum or minimum.

8. The optical transmitter of claim 6, wherein the feedback unit has a light source control unit for generating the feedback signals to control the light source section such that the central component or the line spectra extracted by the optical spectrum extraction unit becomes maximum or minimum.

9. The optical transmitter of claim 6, wherein the part of signals split by the optical spectrum extraction unit are phase inverted components of signals multiplexed by the multiplexer.

10. The optical transmitter of claim 1, wherein the light source section comprises a continuous-wave lights generation unit for generating continuous-wave lights, and a push-pull type Mach-Zehnder modulator driven by a zero-point driving, and
    the encoding section comprises the push-pull type Mach-Zehnder modulator and an encoding unit for encoding output of the push-pull type Mach-Zehnder modulator.

11. The optical transmitter of claim 10, wherein the push-pull type Mach-Zehnder modulator is driven by clock signals having a repetition frequency which is a half of a repetition frequency of the optical clock pulses, such that the optical clock pulses are generated from the continuous-wave lights generated by the continuous-wave lights generation unit while the relative optical phase difference between the optical clock pulses in adjacent time-slots is set to be the odd integer multiple of $\pi$.

12. The optical transmitter of claim 10, wherein the push-pull type Mach-Zehnder modulator is capable of variably setting the duty ratio of the optical clock pulses by controlling a driving amplitude.

13. The optical transmitter of claim 10, wherein the push-pull type Mach-Zehnder modulator optimizes a waveform of the optical clock pulses to a waveform with a high dispersion tolerance by controlling a driving waveform.

14. The optical transmitter of claim 1, wherein the encoding section comprises an LN (Lithium Niobate) modulator having at least one pair of push-pull type modulation electrodes, which is driven by a zero-point driving by setting signals entered into the push-pull type modulation electrodes provided at corresponding positions on a lower side arm and an upper side arm of the LN modulator as mutually inverted signals.

15. The optical transmitter of claim 14, wherein the LN modulator has at least two pairs of the push-pull type modulation electrodes, and multiplexes signals entered into different pairs among the at least two pairs of the push-pull type modulation electrodes.

16. The optical transmitter of claim 1, further comprising an optical bandwidth limiting unit for removing unnecessary higher-order harmonic components contained in optical signals to be generated by the optical transmitter.

17. The optical transmitter of claim 16, wherein the optical bandwidth limiting unit has a transmission bandwidth with a characteristic for blocking components outside a necessary optical signal bandwidth so as to be able to remove the unnecessary higher-order harmonic components.

18. An optical transmission apparatus, comprising:
variably setting a duty ratio of optical clock pulses to a value that makes interferences between pulses small a plurality of optical transmitters provided in parallel and set to output optical signals of mutually different optical wavelengths, each optical transmitter having a light source section configured to generate optical clock pulses synchronized with a signal bit rate while maintaining a duty ratio of the optical clock pulses constant, and an encoding section configured to encode the optical clock pulses by using electric signals synchronized with the optical clock pulses while setting a relative optical phase difference between the optical clock pulses in adjacent time-slots to be an odd integer multiple of $\pi$, and a wavelength division multiplexer configured to output signals obtained by wavelength division multiplexing the optical signals of mutually different optical wavelengths outputted from the plurality of optical transmitters.

19. The optical transmission apparatus of claim 18, wherein the wavelength division multiplexer has a periodic transmission bandwidth with a characteristic for blocking components outside a necessary optical signal bandwidth so as to be able to remove unnecessary higher-order harmonic components.

20. An optical transmitter control method, comprising the steps of:
variably setting a duty ratio of optical clock pulses to a value that makes interferences between pulses small, using a configuration capable of variably setting the duty ratio;

generating the optical clock pulses synchronized with a signal bit rate by maintaining the duty ratio constant; and encoding the optical clock pulses by using electric signals synchronized with the optical clock pulses while setting a relative optical phase difference between the optical clock pulses in adjacent time-slots to be an odd integer multiple of $\pi$.

* * * * *